US012293356B2

(12) United States Patent
Unagami et al.

(10) Patent No.: US 12,293,356 B2
(45) Date of Patent: *May 6, 2025

(54) CONTROL METHOD, DEVICE, AND RECORDING MEDIUM

(71) Applicant: Panasonic Intellectual Property Corporation of America, Torrance, CA (US)

(72) Inventors: Yuji Unagami, Osaka (JP); Junji Michiyama, Fukuoka (JP); Junichiro Soeda, Nara (JP); Motoji Ohmori, Osaka (JP); Tetsuji Fuchikami, Osaka (JP); Yuuki Hirose, Osaka (JP); Naohisa Nishida, Osaka (JP); Masahiro Taguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/838,846

(22) Filed: Jun. 13, 2022

(65) Prior Publication Data

US 2022/0309495 A1 Sep. 29, 2022

Related U.S. Application Data

(63) Continuation of application No. PCT/JP2020/046396, filed on Dec. 11, 2020.
(Continued)

(51) Int. Cl.
*G06Q 20/38* (2012.01)
*G06F 16/27* (2019.01)

(52) U.S. Cl.
CPC ......... *G06Q 20/3825* (2013.01); *G06F 16/27* (2019.01)

(58) Field of Classification Search
CPC .... G06Q 20/3825; G06Q 10/00; G06F 16/27; H04L 9/50
See application file for complete search history.

(56) References Cited

U.S. PATENT DOCUMENTS

2019/0104102 A1\* 4/2019 Khan ................ H04L 61/103
2019/0253239 A1\* 8/2019 Shao ..................... G06Q 10/10
(Continued)

FOREIGN PATENT DOCUMENTS

| JP | 2019-515534 A | \* | 6/2019 | ............. G06F 21/64 |
| KR | 20130047776 A | \* | 5/2019 | ............. G06Q 50/05 |

(Continued)

OTHER PUBLICATIONS

Cambell, Rebecca: Digitalising the mining & metals global supply chain: Rise of blockchain and the smart contract, Sep. 20, 2018, White & Case, pp. 1-13 (Year: 2018).\*
(Continued)

*Primary Examiner* — Bijendra K Shrestha
(74) *Attorney, Agent, or Firm* — Wenderoth, Lind & Ponack, L.L.P.

(57) ABSTRACT

A control method includes: obtaining first transaction data that includes a first variable indicating first information on a first contract made between a first user and a second user, and a second variable set to a predetermined value indicating second information is undetermined; storing the first transaction data into the distributed ledger; executing storing processing of reading out the second variable, and storing it into a rewritable storage in a server; obtaining second transaction data that includes a third variable indicating third information on a second contract made between the first user and a third user, and a change command for changing the second variable, based on the third variable; storing the second transaction data into the distributed ledger; and executing change processing of changing, according to the (Continued)

change command, the second variable from the predetermined value, after the second transaction data is stored into the distributed ledger.

10 Claims, 24 Drawing Sheets

Related U.S. Application Data

(60) Provisional application No. 62/950,536, filed on Dec. 19, 2019.

(56) References Cited

U.S. PATENT DOCUMENTS

| | | | | |
|---|---|---|---|---|
| 2019/0318353 | A1* | 10/2019 | Castinado | G06Q 20/023 |
| 2019/0362287 | A1* | 11/2019 | Achkir | H04L 67/10 |
| 2020/0151715 | A1 | 5/2020 | Sato et al. | |
| 2020/0177386 | A1* | 6/2020 | Mahmood | H04L 9/3239 |
| 2020/0202021 | A1* | 6/2020 | Chee | G06F 21/64 |
| 2020/0357084 | A1* | 11/2020 | Lerato Hunn | G06F 16/2379 |
| 2020/0410439 | A1* | 12/2020 | Blackburn | H04L 9/3231 |
| 2020/0410791 | A1* | 12/2020 | Blackburn | G07C 1/10 |

FOREIGN PATENT DOCUMENTS

| | | | | |
|---|---|---|---|---|
| WO | WO 2029/021792 A1 * | 7/2018 | | G06F 9/46 |
| WO | 2019/003414 | 1/2019 | | |
| WO | 2019/021792 | 1/2019 | | |
| WO | WO-2019003414 A1 * | 1/2019 | | G06Q 10/08 |

OTHER PUBLICATIONS

Jose, Fabio: Building a Smart Contract to Sell Goods, Feb. 18, 2018, Medium, Coinmonks, pp. 1-31 (Year: 2018).*

Gaiardelli et al.: Integrating Smart Contract in Manufacturing for Automated Assessment of Product Quality, 2022, IECON 2022, pp. 1-6 (Year: 2022).*

International Search Report (ISR) issued on Mar. 9, 2021 in International (PCT) Application No. PCT/JP2020/046396.

* cited by examiner

FIG. 4

Transaction data TA

| Code for smart contract CA | | Argument passed to initialization function | Signature 1 | Signature 2 | Transmission date and time |
|---|---|---|---|---|---|
| Variable:<br>Price<br>Material delivery destination<br>Delivery date<br><br>Function:<br>Initialization function (price, delivery date){<br>Material delivery destination = Predetermined value;<br>Price = Price passed as argument;<br>Delivery date = Delivery date passed as argument;<br>} | | - Delivery date = 2019/1/1<br>- Price = 5 million yen | SA | SB | 2018/10/01<br>12:00:00 |

FIG. 5

Transaction data TB

| Code for smart contract CB | Argument passed to initialization function | Signature 1 | Signature 2 | Transmission date and time |
|---|---|---|---|---|
| Variable:<br>Price<br>Product delivery destination<br>Delivery date<br><br>Function:<br>Initialization function (price, delivery date, product delivery destination, contract address, material delivery destination){<br>Price = Price passed as argument;<br>Delivery date = Delivery date passed as argument;<br>Product delivery destination = Product delivery destination passed as argument;<br>Material delivery destination in smart contract identified from argument = Material delivery destination passed as argument;<br>} | - Delivery date = 2019/2/1<br>- Price = 5 million yen<br>- Product delivery destination = Company A<br>- Contract address = Address of smart contract CA<br>- Material delivery destination = Company C | SA | SC | 2018/11/01 12:00:00 |

FIG. 8

Transaction data TB1

| Code for smart contract CB1 | Argument passed to initialization function | Signature 1 | Signature 2 | Transmission date and time |
|---|---|---|---|---|
| Variable:<br>  Price<br>  Product delivery source<br>  Product delivery destination<br>  Delivery date<br>  Related smart contract address<br><br>Function:<br>Initialization function (price, delivery date, product delivery source, product delivery destination, contract address){<br>  Price = Price passed as argument;<br>  Delivery date = Delivery date passed as argument;<br>  Product delivery destination = Product delivery destination passed as argument;<br>  Related smart contract address = Contract address passed as argument;<br>} | - Delivery date = 2019/2/1<br>- Price = 5 million yen<br>- Product delivery source = Company C<br>- Product delivery destination = Company A<br>- Contract address = Address of smart contract CA | SA | SC | 2018/11/01 12:00:00 |

FIG. 9

Transaction data TA1

| Code for smart contract CA1 | Argument passed to initialization function | Signature 1 | Signature 2 | Signature 3 | Transmission date and time |
|---|---|---|---|---|---|
| Variable:<br>Price<br>Material delivery destination<br>Delivery date<br><br>Function:<br>Initialization function (price, delivery date)<br>{<br>Material delivery destination = Company C;<br>Price = Price passed as argument;<br>Delivery date = Delivery date passed as argument;<br>} | - Delivery date = 2019/1/1<br>- Price = 5 million yen | ST | SA | SB | 2018/11/01<br>12:05:00 |

FIG. 13

Transaction data TA2

| Code for smart contract CA2 | Argument passed to initialization function | Signature 1 | Signature 2 | Transmission date and time |
|---|---|---|---|---|
| Variable:<br>- Price<br>- Material delivery destination<br>- Delivery date<br><br>Function:<br>Initialization function (price, delivery date){<br>Material delivery destination = Predetermined value;<br>Price = Price passed as argument;<br>Delivery date = Delivery date passed as argument;<br>}<br>Setting function (material delivery destination){<br>Material delivery destination = Material delivery destination passed as argument;<br>} | - Delivery date = 2019/1/1<br>- Price = 5 million yen | SA | SB | 2018/10/01<br>12:00:00 |

FIG. 14

Transaction data TB2

| Code for smart contract CB2 | Argument passed to initialization function | Signature 1 | Signature 2 | Transmission date and time |
|---|---|---|---|---|
| Variable:<br>Price<br>Material delivery destination<br>Delivery date<br><br>Function:<br>Initialization function (price, delivery date, product delivery destination){<br>  Price = Price passed as argument;<br>  Delivery date = Delivery date passed as argument;<br>  Product delivery destination = Product delivery destination passed as argument;<br>} | - Delivery date = 2019/2/1<br>- Price = 5 million yen<br>- Product delivery destination = Company A | SA | SC | 2018/11/01 12:00:00 |

FIG. 15

Transaction data TA3

| Function to be executed | Argument passed to setting function | Signature 1 | Signature 2 | Transmission date and time |
|---|---|---|---|---|
| Setting function in smart contract CA2 | - Material delivery destination = Company C | SA | SC | 2018/11/01 12:00:00 |

CONTROL METHOD, DEVICE, AND RECORDING MEDIUM

CROSS REFERENCE TO RELATED APPLICATIONS

This is a continuation application of PCT International Application No. PCT/JP2020/046396 filed on Dec. 11, 2020, designating the United States of America, which is based on and claims priority of U.S. Provisional Patent Application No. 62/950,536 filed on Dec. 19, 2019. The entire disclosures of the above-identified applications, including the specifications, drawings and claims are incorporated herein by reference in their entirety.

FIELD

The present disclosure relates to a control method, a device, and a recording medium.

BACKGROUND

There is a technology for managing information on contracts, using distributed ledgers. Information stored in distributed ledgers is managed so as to be substantially unable to be rewritten.

A technology of using the same operating policy and making the operating timings coincide even in a situation in which a plurality of managers are present in a system in which distributed ledgers are used has been disclosed.

CITATION LIST

Patent Literature

PTL 1: WO No. 2019/021792

SUMMARY

Technical Problem

The present disclosure provides, for instance, a control method for reducing an increase in power consumption of a computer system that manages contracts.

Solution to Problem

A control method according to an aspect of the present disclosure is a control method executed by a device out of a plurality of devices each having a distributed ledger in a contract management system that includes the plurality of devices, the control method including: obtaining first transaction data that includes a first variable and a second variable, the first variable indicating first information on a first contract made between a first user and a second user, the second variable indicating second information different from the first information on the first contract and being set to a predetermined value indicating that the second information is undetermined; storing the first transaction data obtained into the distributed ledger; executing storing processing of reading out the second variable included in the first transaction data stored in the distributed ledger, and storing the second variable into a storage included in the device, the storage being rewritable; obtaining second transaction data that includes a third variable and a change command, the third variable indicating third information on a second contract made between the first user and a third user, the change command being a command for changing the second variable, based on the third variable; storing the second transaction data obtained into the distributed ledger; and executing change processing of changing, according to the change command, the second variable stored in the storage from the predetermined value, after the second transaction data is stored into the distributed ledger.

Note that these general and specific aspects may be implemented using a system, a device, an integrated circuit, a computer program, a computer-readable recording medium such as a CD-ROM, or any combination of systems, devices, integrated circuits, computer programs, or recording media.

Advantageous Effects

The control method according to the present disclosure can reduce an increase in power consumption of a computer system that manages contracts.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is an explanatory drawing illustrating a first example of transaction data in Embodiment 1.

FIG. 5 is an explanatory drawing illustrating a second example of transaction data in Embodiment 1.

FIG. 8 is an explanatory drawing illustrating a first example of transaction data in Embodiment 2.

FIG. 9 is an explanatory drawing illustrating a second example of transaction data in Embodiment 2.

FIG. 13 is an explanatory drawing illustrating a first example of transaction data in Embodiment 3.

FIG. 14 is an explanatory drawing illustrating a second example of transaction data in Embodiment 3.

FIG. 15 is an explanatory drawing illustrating a third example of transaction data in Embodiment 3.

DESCRIPTION OF EMBODIMENTS

Figure 1:
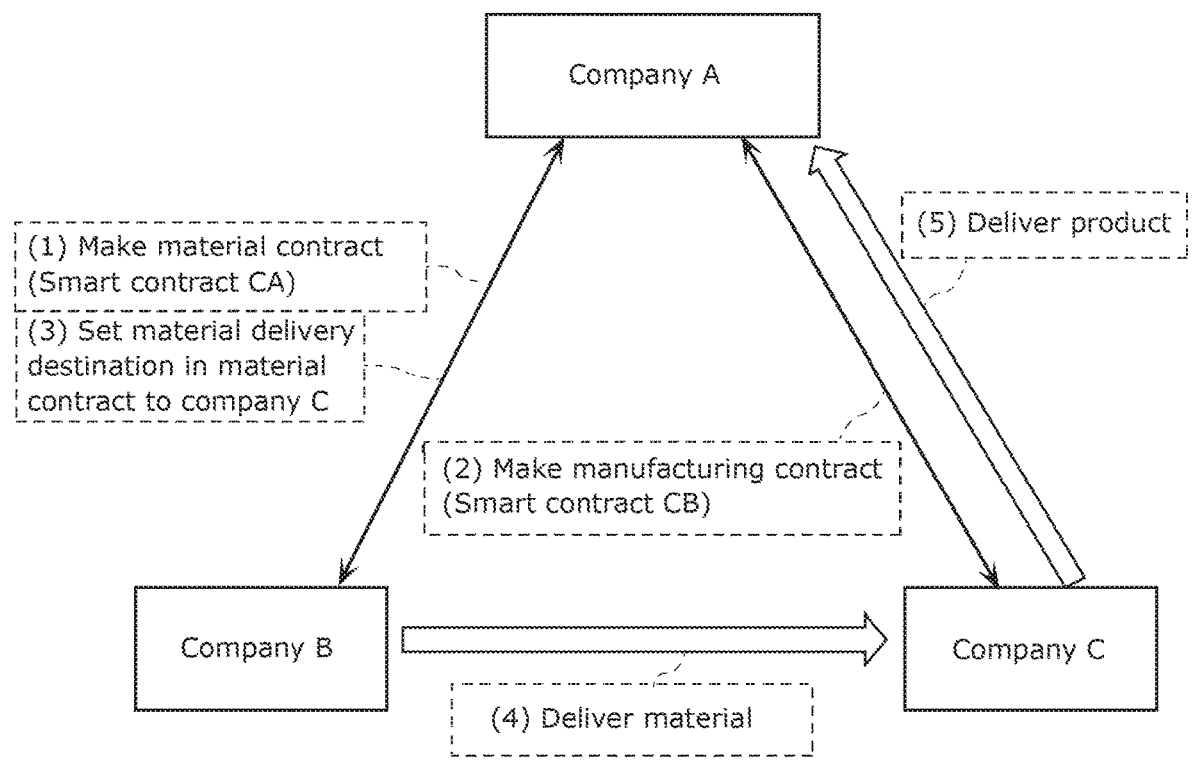
FIG. 1 is an explanatory drawing schematically illustrating examples of flows of contracts in Embodiment 1.

Underlying Knowledge Forming Basis of the Present Disclosure

The inventors have found that the technology related to contracts mentioned in the "Background" section has problems as below.

There is a technology for managing information on contracts, using distributed ledgers. Information stored in distributed ledgers is managed so as to be substantially unable to be rewritten. In addition, there has been a technology for executing processing related to a contract using distributed ledgers and managing the contract. Such a technology can be implemented with use of a smart contract, for example.

There are cases where a plurality of contracts having related contents are sequentially made. For example, there is a case where the content of a later contract is determined, and thereafter the content of an earlier contract is finally determined.

When contracts made in such a manner are managed using distributed ledgers, it is assumed that the content of an earlier contract is stored into the distributed ledgers first, and thereafter the content of a later contract is stored into the distributed ledgers at the point in time when the content of the later contract is determined. However, information stored in the distributed ledgers is managed so as to be substantially unable to be rewritten as stated above, and thus the content of the earlier contract cannot be changed at the point in time when the content of the later contract is determined.

In view of this, when a plurality of contracts having related contents are sequentially made, there is a method for managing, using distributed ledgers, new content of an earlier contract that is altered after the content of a later contract is determined.

If the new content of a contract is determined and managed using distributed ledgers by a person, processing of presenting information to a person and receiving input of information from a person will be necessary, and power consumption of a computer used for the processing increases, which is a problem. In addition, there is a problem that more computer resources, such as, for example, an output device for presenting information (such as a display device or a loudspeaker) and a device for receiving input of information (such as a touch panel, a keyboard, or a mouse), are necessary for the processing.

Furthermore, there is a problem that a person is involved so that manpower is required. Moreover, a problem may arise that a person accidentally generates and stores incorrect content of a contract into distributed ledgers.

The present disclosure provides, for instance, a control method for reducing an increase in power consumption of a computer system that manages contracts.

A control method according to an aspect of the present disclosure is a control method executed by a device out of a plurality of devices each having a distributed ledger in a contract management system that includes the plurality of devices, the control method including: obtaining first transaction data that includes a first variable and a second variable, the first variable indicating first information on a first contract made between a first user and a second user, the second variable indicating second information different from the first information on the first contract and being set to a predetermined value indicating that the second information is undetermined; storing the first transaction data obtained into the distributed ledger; executing storing processing of reading out the second variable included in the first transaction data stored in the distributed ledger, and storing the second variable into a storage included in the device, the storage being rewritable; obtaining second transaction data that includes a third variable and a change command, the third variable indicating third information on a second contract made between the first user and a third user, the change command being a command for changing the second variable, based on the third variable; storing the second transaction data obtained into the distributed ledger; and executing change processing of changing, according to the change command, the second variable stored in the storage from the predetermined value, after the second transaction data is stored into the distributed ledger.

According to the above aspect, even if information that is undetermined at the point in time when the first contract is made is included, transaction data for the first contract is managed using the distributed ledger, and the undetermined information is changed based on the content of the second contract later made, so that the first contract and the second contract are managed. In addition, the undetermined information is changed by computer processing in servers, or stated differently, without a person being involved. Thus, an increase in power consumption of a computer can be reduced, and a necessary number of computer resources can be reduced. Furthermore, labor required if a person performs processing can be decreased. Accordingly, the control method can reduce an increase in power consumption of a computer system that manages contracts.

The first contract may be a contract in which a related user is involved, the related user being different from the first user and the second user, the second information may include identification information of the related user, the second contract may be made between the first user and the third user, the third user being the related user, and the change processing may be processing of changing, according to the change command, the second variable stored in the storage from the predetermined value to the identification information of the third user, the third user being the related user.

According to the above aspect, contracts in which three parties are involved can be appropriately managed. Specifically, even if a related user who is related to the first contract is undetermined when the first contract is made, the first contract and the second contract are appropriately managed when a related user is identified according to the second contract that is made later. Accordingly, the control method can reduce an increase in power consumption of a computer system that manages contracts in which three parties are involved.

The first transaction data may include first contract code that includes the first variable, the second variable, and a storing command for storing the first variable and the second variable into the storage, and the storing processing may be performed by a contract executor executing the storing command included in the first contract code, in response to the first transaction data being stored into the distributed ledger, the contract executor being included in the device.

According to the above aspect, processing of storing the first transaction data into the storage is automatically executed by a smart contract in response to the first transaction data being stored into the distributed ledger, or in other words, is executed without a person being involved. Thus, an increase in power consumption of a computer can be further reduced, and a necessary number of computer resources can be further reduced. In addition, labor required if a person performs processing can be further decreased. Accordingly, the control method can further reduce an increase in power consumption of a computer system that manages contracts.

The first contract code may include a setting function that sets the second variable stored in the storage, and when third transaction data that includes a command for executing the setting function is obtained, the change processing may be performed by the contract executor executing the setting function, in response to the third transaction data obtained being stored into the distributed ledger.

According to the above aspect, processing of setting the second variable is automatically executed by a smart contract in response to the third transaction data being stored into the distributed ledger, or in other words, is executed without a person being involved. Thus, an increase in power consumption of a computer can be further reduced, and a necessary number of computer resources can be further reduced. In addition, labor required if a person performs processing can be further decreased. Accordingly, the control method can further reduce an increase in power consumption of a computer system that manages contracts.

The second transaction data may include second contract code that includes the third variable and the change command, and the change processing may be performed by a contract executor executing the change command, in response to the second transaction data being stored into the distributed ledger, the contract executor being included in the device.

According to the above aspect, processing of changing the second information is automatically executed by a smart contract in response to the second transaction data being stored into the distributed ledger, or in other words, is executed without a person being involved. Thus, an increase in power consumption of a computer can be further reduced, and a necessary number of computer resources can be further reduced. In addition, labor required if a person performs processing can be further decreased. Accordingly, the control method can further reduce an increase in power consumption of a computer system that manages contracts.

The first transaction data may include a digital signature of the first user and a digital signature of the second user, and in storing the first transaction data into the distributed ledger, the first transaction data may be stored into the distributed ledger when the digital signature of the first user and the digital signature of the second user that are included in the first transaction data are both successfully verified.

According to the above aspect, the first transaction data for the first contract includes digital signatures of the first user and the second user who have made the first contract. Thus, it can be proved by verifying the digital signatures that the first user and the second user have certainly made the first contract. Accordingly, the above control method can further appropriately manage contracts.

The second transaction data may include a digital signature of the first user and a digital signature of the third user, and in storing the second transaction data into the distributed ledger, the second transaction data may be stored into the distributed ledger when the digital signature of the first user and the digital signature of the third user that are included in the second transaction data are both successfully verified.

According to the above aspect, the second transaction data for the second contract includes digital signatures of the first user and the third user who have made the second contract. Thus, it can be proved by verifying the digital signatures that the first user and the third user have certainly made the second contract. Accordingly, the above control method can further appropriately manage contracts.

The first contract may include a contract that stipulates that the first user is to purchase material from the second user, and the material purchased is to be delivered to a delivery destination, the first information may include a purchase price of the material and a deadline for delivering the material, the second information may include the delivery destination of the material, the second contract may include a contract that stipulates that the third user is to manufacture a product from the material delivered from the second user, and deliver the product to the first user, and the third information may include a purchase price of the product, a deadline for delivering the product, and a delivery destination of the product.

According to the above aspect, even if the material delivery destination in the material contract is undetermined at the point in time when the material contract is made, the material contract and the manufacturing contract are appropriately managed by changing the manufacturer identified from the manufacturing contract that is made later to the material delivery destination in the material contract. Thus, the above control method can appropriately manage contracts in which three parties are involved, that is, the material contract made between the first user and the second user and the manufacturing contract made between the first user and the third user.

A device according to an aspect of the present disclosure is a device out of a plurality of devices each having a distributed ledger in a contract management system that includes the plurality of devices, the device including: a processor; a ledger storage that stores therein the distributed ledger; an executor; and a storage that is rewritable. The processor obtains first transaction data that includes a first variable and a second variable, and stores the first transaction data obtained into the distributed ledger, the first variable indicating first information on a first contract made between a first user and a second user, the second variable indicating second information different from the first information on the first contract and being set to a predetermined value indicating that the second information is undetermined, the executor executes storing processing of reading out the second variable included in the first transaction data stored in the distributed ledger, and storing the second variable into the storage, the processor further obtains second transaction data that includes a third variable and a change command, and stores the second transaction data obtained into the distributed ledger, the third variable indicating third information on a second contract made between the first user and a third user, the change command being a command for changing the second variable, based on the third variable, and the executor executes change processing of changing, according to the change command, the second variable stored in the storage from the predetermined value, after the second transaction data is stored into the distributed ledger.

According to the above aspect, advantageous effects similar to those achieved by the above control method can be yielded.

A recording medium according to an aspect of the present disclosure is a non-transitory computer-readable recording medium having recorded thereon a program for causing a computer to execute the control method as described above.

According to the above aspect, advantageous effects similar to those achieved by the above control method can be yielded.

Note that these general and specific aspects may be implemented using a system, a device, an integrated circuit, a computer program, a computer-readable recording medium such as a CD-ROM, or any combination of systems, devices, integrated circuits, computer programs, or recording media.

The following specifically describes embodiments with reference to the drawings.

Note that the embodiments described below each show a general or specific example. The numerical values, shapes, materials, elements, the arrangement and connection of the elements, steps, the processing order of the steps, and others indicated in the following embodiments are mere examples, and therefore are not intended to limit the present disclosure. Further, among the elements in the following embodiments, elements not recited in any independent claim defining the most generic concept are described as arbitrary elements.

Embodiment 1

The present embodiment describes, for instance, a contract management system that reduces an increase in power consumption of a computer system that manages contracts and a control method of the contract management system.

FIG. 1 is an explanatory drawing schematically illustrating examples of flows of contracts in the present embodiment.

Specifically, FIG. 1 schematically illustrates contracts in which three parties, company A, company B, and company C that constitute a supply chain are involved, and delivery of items under the contracts. Company A is also referred to as a first user, company B is also referred to as a second user, and company C is also referred to as a third user.

First, company A and company B make a material contract (corresponding to a first contract) as shown by (1) of FIG. 1. The material contract is a contract that stipulates that company A is to purchase material from company B, and company B is to deliver the material to a delivery destination (also referred to as a material delivery destination). The material contract includes a delivery date of material, a purchase price of the material, and a material delivery destination.

Here, assume a case in which at the point in time when company A and company B make the contract, the purchase price of the material and the delivery date of the material are determined, yet the material delivery destination is undetermined. Since the material delivery destination is not yet determined, information indicating "undetermined" is set in the material delivery destination in the material contract.

After the material contract is made, company A and company C make a manufacturing contract (corresponding to a second contract) as shown by (2) in FIG. 1. The manufacturing contract is a contract that stipulates that company C is to manufacture a product from material, and deliver the manufactured product to company A. The material is to be delivered from company B. The manufacturing contract includes a delivery date of the product, a purchase price of the product, and a delivery destination of the product (also referred to as a product delivery destination).

Further, (2) in FIG. 1 specifies that the manufacturer of the product is company C, and thus company C is set in the material delivery destination in the material contract that is made earlier ((3) in FIG. 1).

After that, company B fulfills the material contract by delivering the manufactured material to company C ((4) in FIG. 1). Company C manufactures the product from the material delivered from company B, and delivers the manufactured product to company A, thus fulfilling the manufacturing contract ((5) in FIG. 1).

To execute such processing related to contracts and fulfillment of the contracts using distributed ledgers, it is assumed that one smart contract CA that stipulates content of the material contract and one smart contract CB that stipulates content of the manufacturing contract are used.

In this case, it is assumed that the material delivery destination in smart contract CA is set to "undetermined" when company A and company B make the manufacturing contract, and thereafter is changed or set by smart contract CB performing processing when company A and company C make the manufacturing contract. In order to allow the material delivery destination to be changed or set, the material delivery destination is stored in a rewritable storage region.

By doing so, the above problems of an increase in power consumption of a computer and necessity of more devices can be avoided, and also a problem caused by a person being involved can be avoided.

Note that smart contracts CA and CB have at least a function of managing contents of the material contract and the manufacturing contract, and may further have a function of performing processing related to fulfillment of contracts (for example, manufacture of material or a product, delivery of the manufactured item, and payment of the price, for instance).

The following describes in detail technology for appropriately managing such contracts.

Figure 2:
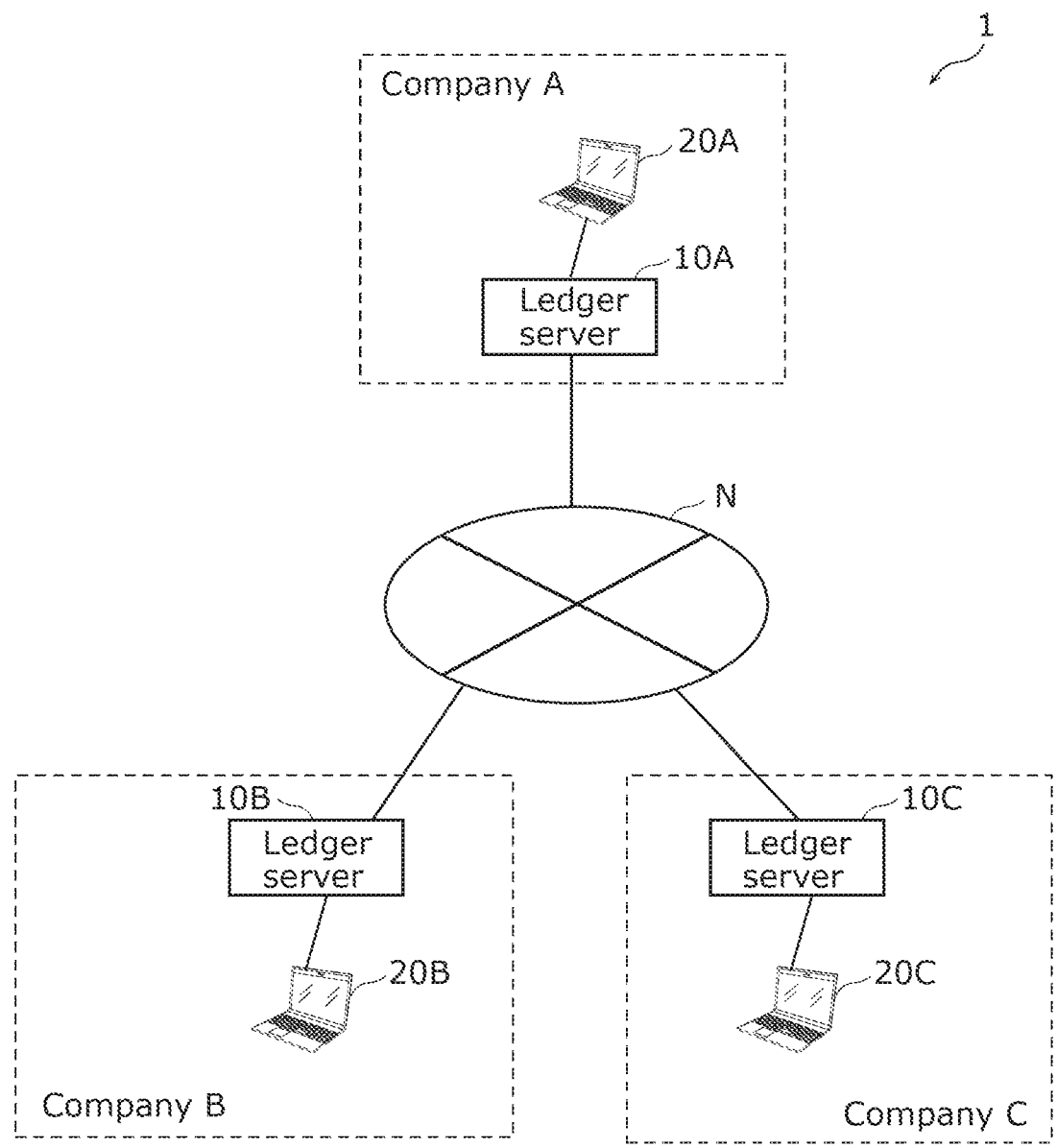
FIG. 2 is a block diagram schematically illustrating a configuration of a contract management system in Embodiment 1.

FIG. 2 is a block diagram schematically illustrating a configuration of contract management system 1 in the present embodiment.

As illustrated in FIG. 2, contract management system 1 includes ledger servers 10A, 10B, and 10C, and terminals 20A, 20B, and 20C.

Ledger servers 10A, 10B, and 10C are also referred to as "ledger servers 10A to 10C", and terminals 20A, 20B and 20C are also referred to as "terminals 20A to 20C".

Ledger server 10A and terminal 20A belong to company A, ledger server 10B and terminal 20B belong to company B, and ledger server 10C and terminal 20C belong to company C. Here, an example in which contract management system 1 manages contracts in which three parties are involved is shown, but nevertheless the number of parties involved in contracts may be four or more.

The devices included in contract management system 1 are directly or indirectly connected to network N, and can communicate with one another via network N.

Network N may include any communication line or network, and may include, for example, the Internet, a mobile phone carrier network, an access network of an Internet provider, or a public access network.

Ledger server 10A is one of ledger servers 10A to 10C that manage contracts using distributed ledgers in contract management system 1. Ledger server 10A may also be referred to as a device.

Ledger server 10A has a distributed ledger. The distributed ledger that ledger server 10A has stores therein transaction data. The transaction data stored in the distributed ledger includes transaction data that includes contract code (also simply referred to as code) for a smart contract related to a contract. Ledger server 10A includes a rewritable storage region other than a storage region in which the distributed ledger is stored, and stores a variable related to a contract into the rewritable storage region.

Ledger servers 10B and 10C are devices having the same function as ledger server 10A, and operate independently from ledger server 10A.

Terminal 20A is an information terminal that a user belonging to company A uses. Terminal 20A is operated by the user, and is used to generate code for a smart contract and to put the code for the smart contract in ledger servers 10A to 10C, for example. Terminal 20A is, for example, a personal computer, a smartphone, or a tablet terminal.

Terminals 20B and 20C each have the same function as terminal 20A, are information terminals used by a user belonging to company B and a user belonging to company C, respectively, and operate independently from terminal 20A.

Note that company A, company B, and company C may each own one or more terminals.

Note that terminal 20A may further have functions of ledger server 10A. In that case, terminal 20A corresponds to a device that manages a contract using a distributed ledger. Similarly, terminal 20B may further have functions of ledger server 10B. In that case, terminal 20B corresponds to a device that manages a contract using a distributed ledger. Moreover, terminal 20C may further have functions of ledger server 10C. In that case, terminal 20C corresponds to a device that manages a contract using a distributed ledger.

Figure 3:
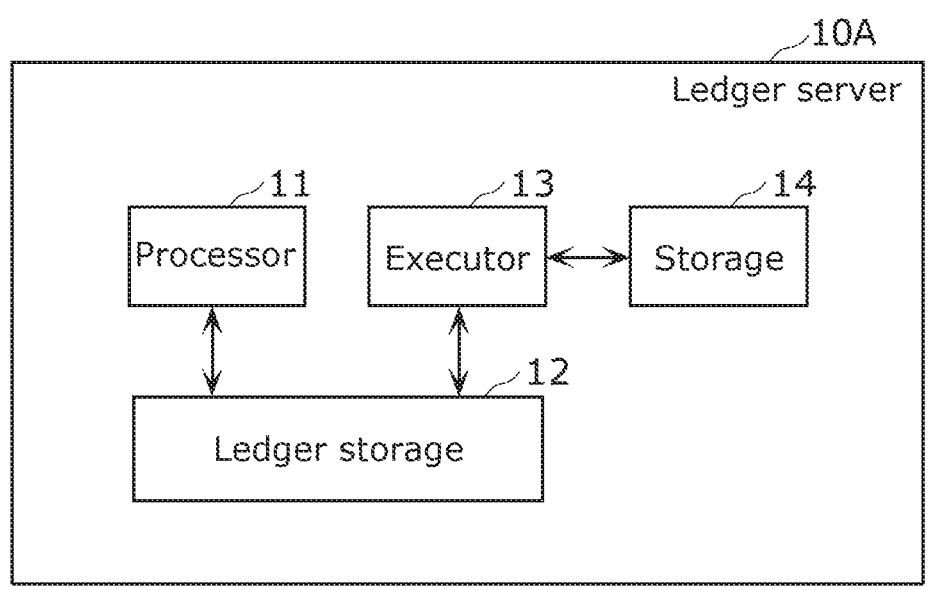
FIG. 3 is a block diagram illustrating a functional configuration of a ledger server in Embodiment 1.

FIG. 3 is a block diagram illustrating a functional configuration of ledger server 10A in the present embodiment.

As illustrated in FIG. 3, ledger server 10A includes processor 11, ledger storage 12, executor 13, and storage 14.

Processor 11 is a functional unit that executes processing related to transaction data. Processor 11 can be acquired by a processing unit (for example, a central processing unit (CPU)) included in ledger server 10A executing a program using a memory.

Processor 11 executes processing of obtaining transaction data, and storing the obtained transaction data into the distributed ledger. Further, processor 11 executes processing of generating transaction data, generating a digital signature (also simply referred to as a signature) for the generated transaction data, and giving the generated signature to the transaction data.

In storing new transaction data into the distributed ledger, processor 11 stores the new transaction data into ledger storage 12 in the form according to the type of the distributed ledger. Processor 11 transmits communication data to and receives communication data from ledger storage 12 that is included in another ledger server out of ledger servers 10A to 10C, and causes ledger storage 12 included in the other ledger server to also store the transaction data. For example, when the distributed ledger is a blockchain, processor 11 generates a block that includes new transaction data, and stores the block into ledger storage 12 after ledger servers 10A to 10C reach agreement on the generated block by consensus algorithm.

Specifically, processor 11 obtains first transaction data, and stores the obtained first transaction data into the distributed ledger. The first transaction data includes a first variable indicating information (also referred to as first information) on a material contract (that is, the first contract) between company A and company B, and a second variable indicating information (also referred to as second information) different from the first information on the first contract and set to a predetermined value indicating that the second information is undetermined. In other words, the first information is specified when the first contract is made, and the second information is not specified when the first contract is made.

Further, processor 11 obtains second transaction data, and stores the obtained second transaction data into the distributed ledger. The second transaction data includes a third variable indicating information (also referred to as third information) on the manufacturing contract (that is, the second contract) made between company A and company C, and a change command for changing the second variable based on the third variable.

Ledger storage 12 stores therein the distributed ledger. The distributed ledger stored in ledger storage 12 stores one or more transaction data items, and is managed using features of hash values, for instance, so that manipulation is difficult (this will be described later). Ledger storage 12 stores transaction data provided by processor 11 into the distributed ledger. The distributed ledger stores past to current transaction data items. Such transaction data items are managed so as not to be manipulated, based on a feature that information recorded in a distributed ledger is difficult to be manipulated.

Note that the distributed ledger is a blockchain, for example, and such a case is described as an example. Yet it is possible to adopt a distributed ledger according to another technique (such as IOTA or Hashgraph, for example). Note that the distributed ledger may be or may not be a ledger for which consensus algorithm (for example, Practical Byzantine Fault Tolerance (PBFT), Proof of Work (PoW), or Proof of Stake (PoS)) is executed when new data is stored. An example of distributed ledger technology in which consensus algorithm is not executed is Hyperledger Fabric.

Executor 13 is a functional unit that executes processing with reference to transaction data stored in the distributed ledger stored in ledger storage 12. Executor 13 can be acquired by the processing unit (a CPU, for example) included in ledger server 10A executing a program using memory. Here, the case in which executor 13 is a contract executor that executes processing in accordance with smart contract code included in transaction data stored in the distributed ledger is to be described as an example.

Specifically, after the first transaction data is stored into the distributed ledger, executor 13 executes storing processing of reading out the second variable included in the first transaction data stored in the distributed ledger, and storing the second variable into storage 14.

The storing processing is performed by executor 13 executing the first contract code, in response to the first transaction data being stored into the distributed ledger, for example.

Further, after the second transaction data is stored into the distributed ledger, executor 13 executes change processing of changing the second variable stored in storage 14 from the predetermined value, according to the change command included in the second transaction data.

The change processing is performed by executor 13 executing the second contract code, in response to the second transaction data being stored into the distributed ledger, for example.

Storage 14 is a storage device that includes a storage region storing variables. Variables indicate information on contracts, and specifically include the first variable, the second variable, and the third variable. The variables stored in storage 14 are set and read out by executor 13. Storage 14 is acquired using a rewritable storage device, examples of which include memory such as random access memory (RAM), a hard disk drive (HDD), and a solid state drive (SSD).

Note that multi-signature (multisig) technology for giving a plurality of signatures may be applied to the first transaction data and the second transaction data, and this case will be described as an example, but a single digital signature may be given to the first transaction data and the second transaction data.

Specifically, the first transaction data may include digital signatures of company A and company B that are the contractors of the material contract. In that case, in storing the first transaction data into the distributed ledger, processor 11 stores the first transaction data into the distributed ledger when the digital signatures of company A and company B included in the first transaction data are both successfully verified.

Similarly, the second transaction data may include digital signatures of company A and company C that are the contractors of the manufacturing contract. In that case, in storing the second transaction data into the distributed ledger, processor 11 stores the second transaction data into the distributed ledger when the digital signatures of company A and company C included in the second transaction data are both successfully verified.

Note that the material contract and the manufacturing contract can be described as below.

It can be said that the material contract is a contract in which a user (also referred to as a related user) different from company A and company B that are the contractors of the material contract is involved.

The first information in the material contract includes the purchase price and the delivery date of the material that are information items specified when the material contract is made. Examples of the first variable include a variable indicating the above price, and a variable indicating the above delivery date.

The second information in the material contract includes the material delivery destination that is information unspecified when the material contract is made. The material delivery destination corresponds to a related user. The material delivery destination is unspecified and undetermined when the material contract is made. An example of the second variable is a variable indicating the material delivery destination, and the variable indicating a material delivery destination is set to a predetermined value indicating that the second information is undetermined when the material contract is made. For the predetermined value, a numerical value (zero, for example) that is actually not used to indicate the material delivery destination or a predetermined reserved value, which fall within a range of numerical values that can be assigned to the second variable, can be used.

The manufacturing contract is a contract made between company A and company C. The third information in the manufacturing contract includes a variable indicating the purchase price of a product, a variable indicating the delivery deadline for the product, and a variable indicating the delivery destination of the product. Company C that is a contractor other than company A among the contractors of the manufacturing contract corresponds to a related user in the material contract. Thus, by the manufacturing contract being made, company C that is a contractor other than company A among the contractors of the manufacturing contract is identified as corresponding to a related user in the material contract.

In view of this, in the change processing, the variable indicating a material delivery destination as the second variable stored in storage 14 is changed from the predetermined value to a third user that is the related user according to the change command included in the second transaction data.

Note that in the material contract, one or more of information items indicating the purchase price of the material, the delivery date of the material, and the material delivery destination may each be the first information. In this case, information other than the first information among the purchase price of the material, the delivery date of the material, and the material delivery destination is the second information.

In this case, the manufacturing contract includes the first information itself or information that specifies the first information. By the manufacturing contract being made, the first information is specified, and the first information in the material contract is changed according to the change command included in the second transaction data.

The following describes transaction data and code for a smart contract.

FIG. 4 is an explanatory drawing illustrating transaction data TA that is a first example of transaction data in the present embodiment. Transaction data TA corresponds to first transaction data. Transaction data TA is generated by ledger server 10A, for example.

As illustrated in FIG. 4, transaction data TA includes "Code for smart contract CA", "Argument passed to initialization function", "Signature 1", "Signature 2", and "Transmission date and time".

"Code for smart contract CA" includes a variable portion indicating variables used by smart contract CA and stored in storage 14. The variable portion is shown by the broken line frame in FIG. 4. The same expression is also used in the following. The variables used by smart contract CA include a price, a material delivery destination, and a delivery date. The price indicates the amount of money company A pays in the material contract. The material delivery destination indicates the delivery destination of the material manufactured by company B under the material contract. The delivery date indicates the deadline by which company B is to deliver the material to the material delivery destination.

Further, "Code for smart contract CA" includes an initialization function. The initialization function is a special function that is executed by executor 13 when the transaction data is stored into a distributed ledger. The same also applies hereinafter.

The initialization function receives a price and a delivery date as arguments. Further, if the initialization function is executed, the initialization function assigns values to the variable indicating a material delivery destination, the variable indicating a price, and the variable indicating a delivery date, which are stored in storage 14. Specifically, if the initialization function is executed, the initialization function sets the variable indicating a material delivery destination to the predetermined value, sets the variable indicating a price to the price received as an argument, and the variable indicating a delivery date to the delivery date received as an argument.

Note that equivalent advantageous effects can be achieved also in the case in which the function shown as the initialization function in FIG. 4 is a general function (or in other words, not the initialization function), and the general function is executed using transaction data TA. The same also applies to an initialization function included in code for another smart contract.

"Argument passed to initialization function" is an argument that is passed to the initialization function in smart contract CA, and includes the delivery date (Jan. 1, 2019) and the price (5 million yen). Information items indicated as the arguments are passed to the initialization function.

"Signature 1" is the first one of two digital signatures given to transaction data TA. Signature 1 includes signature SA of company A.

"Signature 2" is the second one of the two digital signatures given to transaction data TA. Signature 2 includes signature SB of company B.

"Transmission date and time" indicates the date and time at which transaction data TA is transmitted. "2018/10/01 12:00:00" is stored in "Transmission date and time".

When transaction data TA shown in FIG. 4 is stored into the distributed ledger, by the initialization function being executed, the variables indicating the price and the delivery date in storage 14 are set to the price and the delivery date, respectively, passed to the initialization function as arguments.

FIG. 5 is an explanatory drawing illustrating transaction data TB that is a second example of transaction data in the present embodiment. Transaction data TB corresponds to second transaction data. Transaction data TB is generated by ledger server 10A, for example.

As illustrated in FIG. 5, transaction data TB includes "Code for smart contract CB", "Argument passed to initialization function", "Signature 1", "Signature 2", and "Transmission date and time".

"Code for smart contract CB" includes a variable portion and an initialization function. The variables used by smart contract CB include a price, a product delivery destination, and a delivery date. The price indicates the amount of money company A pays in the manufacturing contract. The product delivery destination indicates the delivery destination of a product manufactured by company C under the manufacturing contract. The delivery date indicates the deadline by which company C is to deliver the product to the product delivery destination.

The initialization function receives a price, a delivery date, a product delivery destination, a contract address, and a material delivery destination, as arguments. Further, if the initialization function is executed, the initialization function assigns values to the variable indicating a product delivery destination, the variable indicating a price, and the variable indicating a delivery date, which are stored in storage 14. Specifically, if the initialization function is executed, the initialization function sets the variable indicating a price to the price received as an argument, sets the variable indicating a delivery date to the delivery date received as an argument, and sets the variable indicating a product delivery destination to the product destination received as an argument. Further, if the initialization function is executed, the initialization function sets the variable indicating a material delivery destination in the smart contract that is identified from the argument is set to the material delivery destination received as an argument.

"Argument passed to initialization function" is an argument passed to the initialization function in smart contract CB, and includes the delivery date (Feb. 1, 2019), the price (5 million yen), the product delivery destination (identification information of company A), the contract address (the address of smart contract CA), and the material delivery destination (identification information of company C). Information items indicated as the arguments are passed to the initialization function. Note that the identification information of company A set in the product delivery destination that is a variable may also be simply referred to as company A. The same also applies to company B and company C. The same also applies hereinafter.

"Signature 1" is the first one of two digital signatures given to transaction data TB. Signature 1 includes signature SA of company A.

"Signature 2" is the second one of the two digital signatures given to transaction data TB. Signature 2 includes signature SC of company C.

"Transmission date and time" indicates the date and time at which transaction data TB is transmitted. "2018/11/01 12:00:00" is stored in "Transmission date and time".

When transaction data TB shown in FIG. 5 is stored into a distributed ledger, by the initialization function being executed, the variables indicating the delivery date, the price, and the product delivery destination in storage 14 are set to the delivery date, the price, and the product delivery destination, respectively, passed to the initialization function as arguments. The material delivery destination in smart contract CA is changed to company C, based on the contract address and the material delivery destination passed to the initialization function as arguments.

Figure 6:
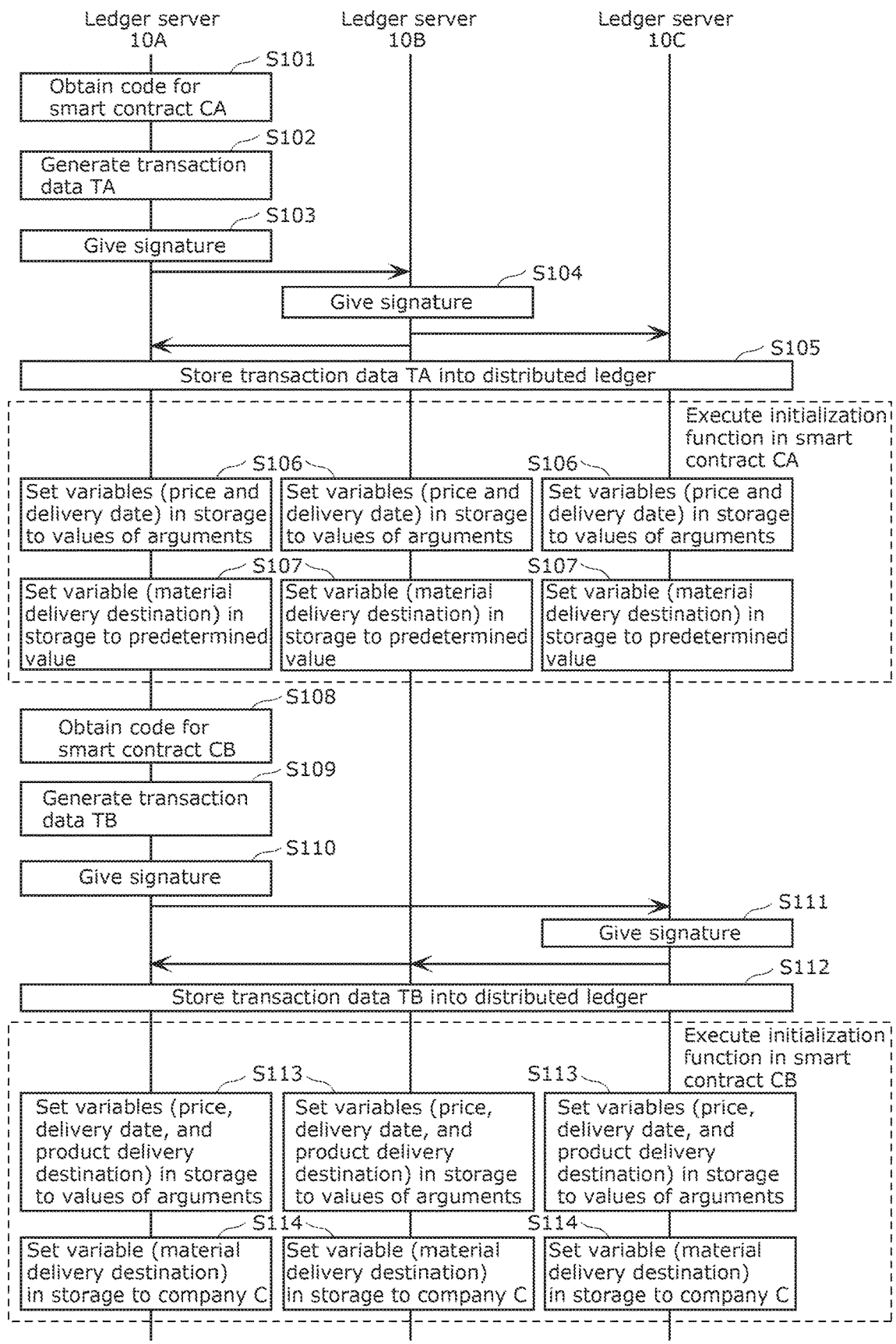
FIG. 6 is a sequence diagram illustrating processing in the contract management system in Embodiment 1.

FIG. 6 is a sequence diagram illustrating processing in contract management system 1 in the present embodiment. FIG. 6 illustrates a series of processes related to making a material contract, making a manufacturing contract, and changing content of the material contract.

In step S101, processor 11 of ledger server 10A obtains code for smart contract CA. The code for smart contract CA may be obtained by ledger server 10A generating the code or by ledger server 10A receiving the code transmitted from terminal 20A in response to an operation made by a person in charge of company A.

In step S102, processor 11 of ledger server 10A generates transaction data TA. Transaction data TA generated includes the code for smart contract CA obtained in step S101 (see FIG. 4).

In step S103, processor 11 of ledger server 10A generates a signature for transaction data TA generated in step S102, gives the signature to transaction data TA, and transmits transaction data TA having the signature to ledger server 10B. In step S104, processor 11 of ledger server 10B receives transaction data TA transmitted in step S103, generates a signature for transaction data TA received, gives the signature to transaction data TA, and transmits transaction data TA having the signatures to each of ledger servers 10A and 10C. Accordingly, all ledger servers 10A to 10C are in a state of having transaction data TA to which the signatures of ledger servers 10A and 10B are given.

In step S105, each of ledger servers 10A to 10C stores (transmitted) transaction data TA to which the signature is additionally given in step S104, into the distributed ledger. In storing transaction data TA into the distributed ledgers, transaction data TA may be stored into the distributed ledgers under a condition that ledger servers 10A to 10C reach agreement based on consensus algorithm.

Each of processors 11 of ledger servers 10A to 10C executes the initialization function in smart contract CA in response to transaction data TA being stored into the distributed ledger in step S105, to perform step S106 and step S107 as below.

In step S106, processors 11 of ledger servers 10A to 10C each set the variable indicating a price and the variable indicating a delivery date, which are stored in storage 14, to the price and the delivery date passed to the initialization function as arguments in transaction data TA.

In step S107, processors 11 of ledger servers 10A to 10C each set the variable indicating a material delivery destination, which is stored in storage 14, to the predetermined value. The predetermined value indicates that the material delivery destination is undetermined.

In step S108, processor 11 of ledger server 10A obtains code for smart contract CB. The code for smart contract CB may be obtained by ledger server 10A generating the code or by ledger server 10A receiving the code transmitted from terminal 20A in response to an operation made by a person in charge of company A.

In step S109, processor 11 of ledger server 10A generates transaction data TB. Transaction data TB generated includes the code for smart contract CB obtained in step S108 (see FIG. 5).

In step S110, processor 11 of ledger server 10A generates a signature for transaction data TB generated in step S109, gives the signature to transaction data TB, and transmits transaction data TB having the signature to ledger server 10C.

In step S111, processor 11 of ledger server 10C receives transaction data TB transmitted in step S110, generates a signature for transaction data TB received, gives the signature to transaction data TB, and transmits transaction data TB having the signatures to each of ledger servers 10A and 10B. Accordingly, all ledger servers 10A to 10C are in a state of having transaction data TB to which the signatures of ledger servers 10A and 10C are given.

In step S112, each of ledger servers 10A to 10C stores (transmitted) transaction data TB to which the signature is additionally given in step S111, into the distributed ledger. In storing transaction data TB into the distributed ledgers, transaction data TB may be stored into the distributed ledgers under a condition that ledger servers 10A to 10C reach agreement based on consensus algorithm.

Each of processors 11 of ledger servers 10A to 10C executes the initialization function in smart contract CB in response to transaction data TB being stored into the distributed ledger in step S112, to perform step S113 and step S114 as below.

In step S113, processors 11 of ledger servers 10A to 10C each set the variable indicating a price, the variable indicating a delivery date, and the variable indicating a product delivery destination, which are stored in storage 14, to the price, the delivery date, and the product delivery destination passed to the initialization function as arguments in transaction data TB. In step S114, processors 11 of ledger servers 10A to 10C each set the variable indicating a material delivery destination in smart contract CA, which is stored in storage 14, to identification information of company C.

Note that, here, the case has been described in which ledger server 10A (that is, company A) generates code for smart contracts and transaction data related to the material contract and the manufacturing contract, yet company B and company C may instead generate such code and data related to the material and manufacturing contracts, respectively.

Contract management system 1 can change, by performing the series of processes as described above, information that is undetermined when company A and company B make the material contract, based on the manufacturing contract being thereafter made between company A and company C. Accordingly, contract management system 1 can reduce an increase in power consumption of a computer system that manages contracts, while appropriately managing contracts in which company A, company B, and company C are involved.

Embodiment 2

The present embodiment describes, for instance, a contract management system that reduces an increase in power consumption of a computer system that manages contracts and a control method of the contract management system according to aspects different from Embodiment 1.

The contract management system according to the present embodiment includes a transaction server which is different from ledger servers 10A to 10C provided by companies involved in contracts, and contributes to appropriate contract management by the transaction server. As change processing, the transaction server generates new transaction data and manages the new transaction data as valid data, and also manages transaction data already stored in its distributed ledger as invalid data. Here, transaction data already stored in the distributed ledger includes undetermined information and a smart contract corresponding to a contract in which a material delivery destination, for example, is undetermined. The new transaction data includes new content of a contract, and includes a smart contract that stipulates the new content of the contract in which the material delivery destination is changed in response to a manufacturing contract being made, for example.

The flows of contracts in the present embodiment are similar to those in Embodiment 1 (see FIG. 1).

Figure 7:
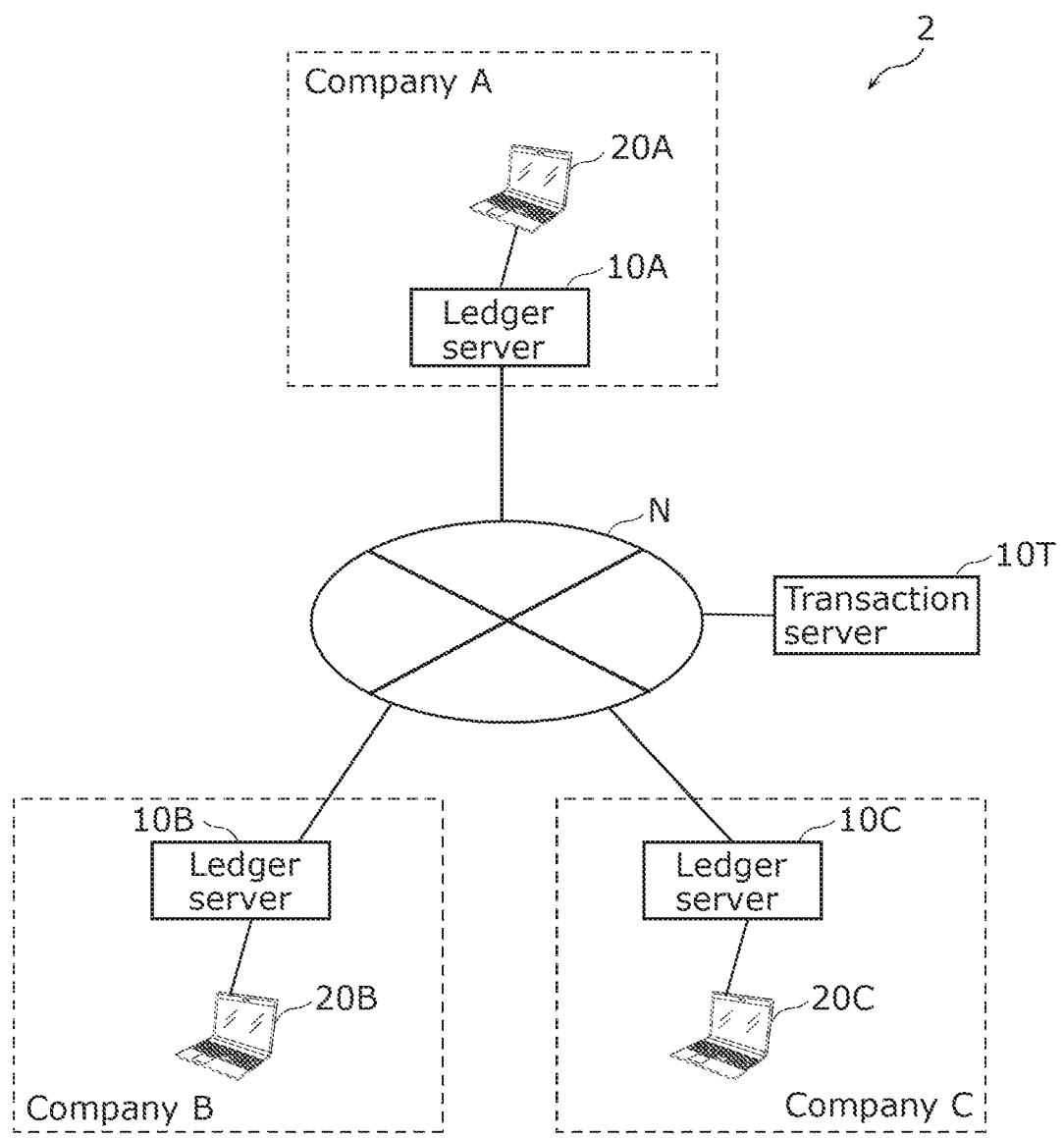
FIG. 7 is a block diagram schematically illustrating a configuration of a contract management system in Embodiment 2.

FIG. 7 is a block diagram schematically illustrating a configuration of contract management system 2 in the present embodiment.

As illustrated in FIG. 7, contract management system 2 includes ledger servers 10A, 10B, and 10C, terminals 20A, 20B, and 20C, and transaction server 10T.

Ledger servers 10A to 10C and terminals 20A to 20C are the same as those in Embodiment 1. However, a smart contract related to a manufacturing contract is different (smart contract CB1 later described).

Transaction server 10T is a server device that has a distributed ledger similarly to ledger servers 10A to 10C. Transaction server 10T stores transaction data into the distributed ledger, similarly to ledger servers 10A to 10C. Transaction server 10T includes a rewritable storage region other than a storage region in which the distributed ledger is stored, and stores variables related to a contract into the rewritable storage region. Further, transaction server 10T generates and stores a new smart contract into the distributed ledger, based on the transaction data stored into the distributed ledger. In generating a new smart contract, transaction server 10T refers to relevant information included in transaction data stored in the distributed ledger. The relevant information includes, for example, information that identifies a smart contract relevant to the transaction data stored in the distributed ledger, and includes, for example, an address of the smart contract (also referred to as a contract address). After storing the new transaction data into the distributed ledger, transaction server 10T manages a smart contract included in the stored new transaction data as a valid contract, and manages a smart contract included in transaction data stored when a material contract is made (that is, the smart contract identified using the relevant information) as an invalid contract.

Transaction server 10T is connected directly or indirectly to network N, and can communicate with ledger servers 10A to 10C via network N.

Transaction server 10T has a similar functional configuration to those of ledger servers 10A to 10C (see FIG. 3).

FIG. 8 is an explanatory drawing illustrating transaction data TB1 that is a first example of transaction data in the present embodiment. Transaction data TB1 is similar to transaction data TB in Embodiment 1 (see FIG. 5). The following describes transaction data TB1, focusing on differences from transaction data TB.

As illustrated in FIG. 8, transaction data TB1 includes "Code for smart contract CB1", "Argument passed to initialization function", "Signature 1", "Signature 2", and "Transmission date and time".

"Code for smart contract CB1" includes a variable portion and an initialization function. Variables used by smart contract CB1 include a price, a product delivery source, a product delivery destination, a delivery date, and a relevant smart contract address. The product delivery source indicates a delivery source of a product manufactured by company C under the manufacturing contract. The relevant smart contract is an example of relevant information, and indicates an address of a smart contract relevant to smart contract CB1. Other variables are the same as those of smart contract CB.

The initialization function receives a price, a delivery date, a product delivery source, a product delivery destination, and a contract address, as arguments. Further, if the initialization function is executed, the initialization function assigns values to the variable indicating a price, the variable indicating a delivery date, the variable indicating a product delivery destination, and the variable indicating a relevant smart contract address, which are stored in storage 14. Specifically, if the initialization function is executed, the initialization function sets the variable indicating a price to the price received as an argument, sets the variable indicating a delivery date to the delivery date received as an argument, sets the variable indicating a product delivery destination to the product delivery destination received as an argument, and sets the variable indicating a relevant contract address to the contract address received as an argument.

The arguments passed to the initialization function are arguments passed to the initialization function in smart contract CB1, and include the delivery date (Feb. 1, 2019), the price (5 million yen), the product delivery source (identification information of company C), the product delivery destination (identification information of company A), and a contract address (the address of smart contract CA). Information items indicated as the arguments are passed to the initialization function.

"Signature 1", "Signature 2", and "Transmission date and time" are the same as those in transaction data TB in Embodiment 1.

When transaction data TB1 shown in FIG. 8 is stored into the distributed ledger, by the initialization function being executed, the variables indicating the delivery date, the price, and the product delivery destination in storage 14 are set to the delivery date, the price, and the product delivery destination, respectively, passed to the initialization function as arguments. The material delivery destination in new smart contract CA1 which will be described below is changed to company C, based on the contract address and the product delivery source passed to the initialization function as arguments.

FIG. 9 is an explanatory drawing illustrating transaction data TA1 that is a second example of transaction data in the present embodiment. Transaction data TA1 includes a new smart contract in which the material delivery destination is set, and is generated by transaction server 10T. Transaction data TA1 is similar to transaction data TA in Embodiment 1 (see FIG. 4). The following describes transaction data TA1, focusing on differences from transaction data TA.

As illustrated in FIG. 9, transaction data TA1 includes "Code for smart contract CA1", "Argument passed to initialization function", "Signature 1", "Signature 2", "Signature 3", and "Transmission date and time".

"Code for smart contract CA1" includes a variable portion and an initialization function. The variables used by smart contract CA1 include a price, a material delivery destination, and a delivery date, similarly to smart contract CA.

The initialization function receives a price and a delivery date as arguments. Further, if the initialization function is executed, the initialization function assigns values to the variable indicating a material delivery destination, the variable indicating a price, and the variable indicating a delivery date, which are stored in storage 14. Specifically, if the initialization function is executed, the initialization function sets the variable indicating a material delivery destination to identification information of company C, sets the variable indicating a price to the price received as an argument, and the variable indicating a delivery date to the delivery date received as an argument.

"Argument passed to initialization function" shows an argument that is passed to the initialization function in smart contract CA1, and includes the delivery date (Jan. 1, 2019) and the price (5 million yen). Information items indicated as the arguments are passed to the initialization function.

"Signature 1" is the first one of three digital signatures given to transaction data TA1. Signature 1 includes signature ST of transaction server 10T.

"Signature 2" is the second one of the three digital signatures given to transaction data TA1. Signature 2 includes signature SA of company A.

"Signature 3" is the third one of the three digital signatures given to transaction data TA1. Signature 3 includes signature SB of company B.

"Transmission date and time" indicates the date and time at which transaction data TA1 is transmitted. "2018/11/01 12:05:00" is stored in "Transmission date and time".

When transaction data TA1 shown in FIG. 9 is stored into the distributed ledger, by the initialization function being executed, the variables indicating the price and the delivery date in storage 14 are set to the price and the delivery date, respectively, passed to the initialization function as arguments, and the variable indicating a material delivery destination in storage 14 is set to identification information of company C.

Figure 10:
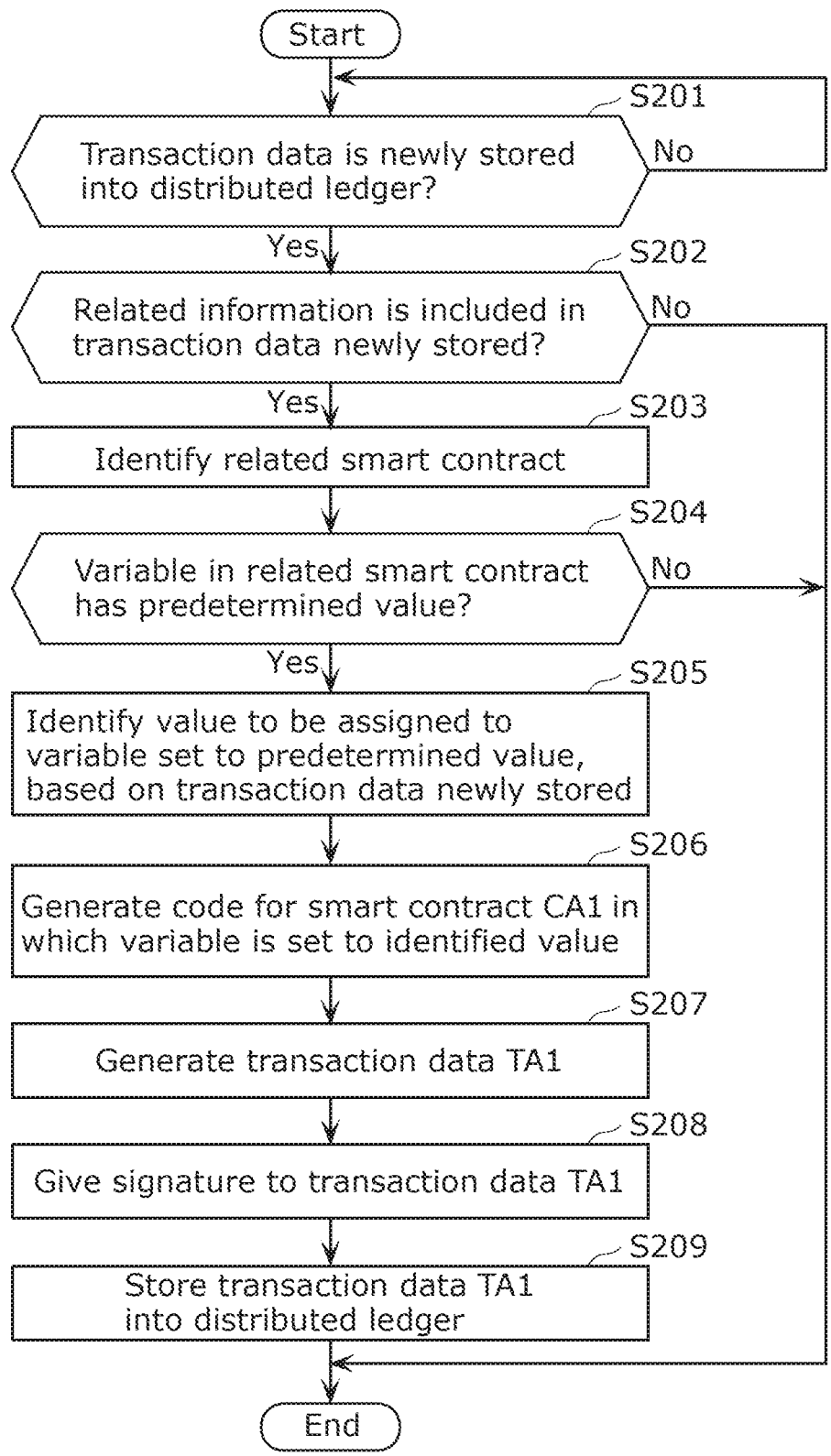
FIG. 10 is a flowchart illustrating processing performed by a transaction server in Embodiment 2.

FIG. 10 is a flowchart illustrating processing performed by transaction server 10T in the present embodiment. The flowchart illustrated in FIG. 10 illustrates processing performed by transaction server 10T to generate and store transaction data TA1 into the distributed ledger.

In step S201, processor 11 of transaction server 10T determines whether transaction data is newly stored into the distributed ledger that ledger storage 12 has. When transaction data is determined to be newly stored (Yes in step S201), the processing proceeds to step S202. Otherwise (No in step S201), step S201 is executed again. Thus, processor 11 waits in step S201 until transaction data is newly stored.

In step S202, processor 11 of transaction server 10T determines whether the transaction data newly stored into the distributed ledger includes relevant information. If relevant information is determined to be included (Yes in step S202), the processing proceeds to step S203. Otherwise (No in step S202), the series of processes illustrated in FIG. 10 ends.

In step S203, processor 11 of transaction server 10T identifies a relevant smart contract, based on the relevant information included in the transaction data newly stored into the distributed ledger. For example, when transaction data TB1 illustrated in FIG. 8 is newly stored into the distributed ledger, processor 11 identifies smart contract CA as the relevant smart contract.

In step S204, processor 11 of transaction server 10T determines whether a variable of the relevant smart contract identified in step S203 has a predetermined value. If a predetermined value is determined to be included, the processing proceeds to step S205. Otherwise, the series of processes illustrated in FIG. 10 ends. For example, processor 11 finds that smart contract CA identified as a relevant smart contract includes a predetermined value as the material delivery destination (see FIG. 4), and processing proceeds to step S205.

In step S205, processor 11 of transaction server 10T identifies a value that is to be assigned to the variable having the predetermined value, based on the transaction data newly stored.

In step S206, processor 11 of transaction server 10T generates code for smart contract CA1 in which the variable is set to the identified value in step S205.

In step S207, processor 11 of transaction server 10T generates transaction data TA1 that includes the code for smart contract CA1 generated in step S206.

In step S208, processor 11 of transaction server 10T gives a signature to transaction data TA1 generated in step S207. Transaction data TA1 to which transaction server 10T has given the signature is transmitted to ledger server 10A, and is given a signature of ledger server 10A. After that, transaction data TA1 is transmitted to ledger server 10B, is given a signature of ledger server 10B, and thereafter is transmitted to ledger servers 10A and 10C and transaction server 10T.

In step S209, processor 11 of transaction server 10T stores transaction data TA1 to which the signatures are given in step S208 into the distributed ledger. At this time, each of ledger servers 10A to 10C also stores transaction data TA1 into the distributed ledger. Accordingly, the distributed ledgers of ledger servers 10A to 10C and transaction server 10T are all in a state in which transaction data TA1 is stored.

Figure 11:
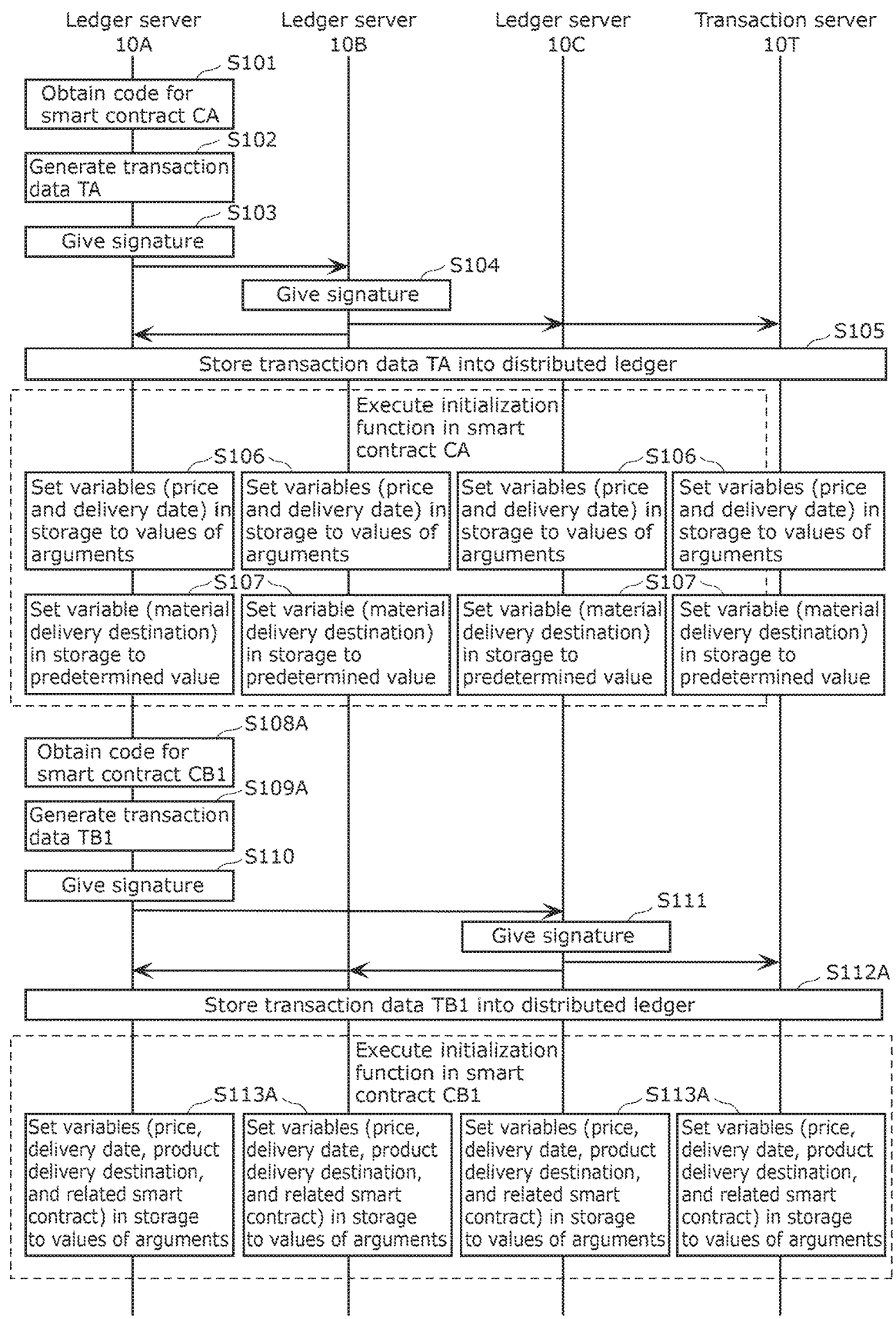
FIG. 11 is a first sequence diagram illustrating processing in the contract management system in Embodiment 2.
Figure 12:
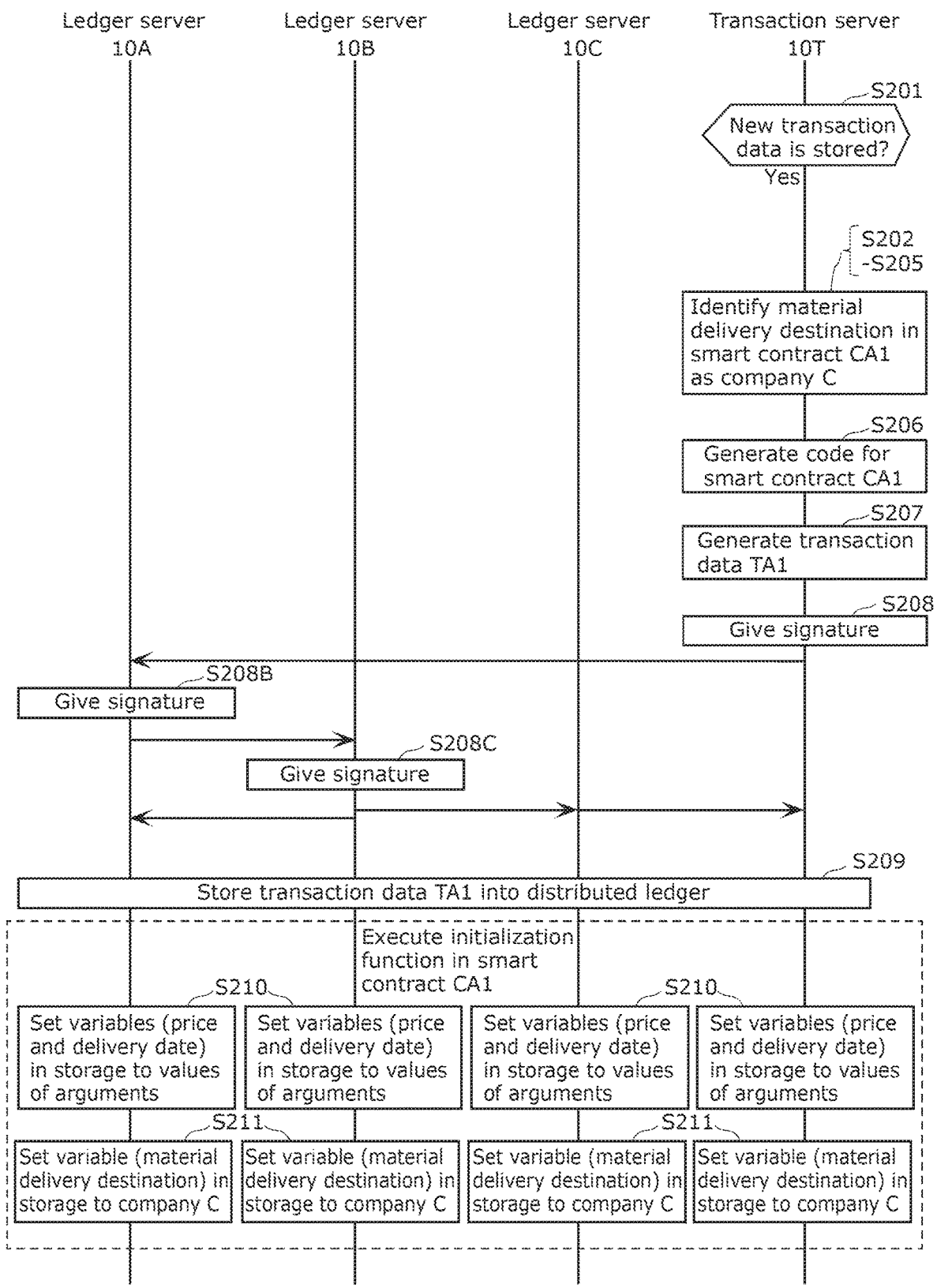
FIG. 12 is a second sequence diagram illustrating processing in the contract management system in Embodiment 2.

FIG. 11 and FIG. 12 are sequence diagrams each illustrating processing in contract management system 2 in the present embodiment.

In the sequence diagrams illustrated in FIG. 11 and FIG. 12, the same signs are given to the same processing as that of the sequence diagram in FIG. 6 and the same processing as that of the flowchart in FIG. 10, and thus a detailed description is omitted.

In steps S101 to S105, each of processors 11 of ledger servers 10A to 10C and transaction server 10T obtains and stores transaction data TA that includes code for smart contract CA into the distributed ledger.

In steps S106 to S107, each of processors 11 of ledger servers 10A to 10C and transaction server 10T sets the price, the delivery date, and the material delivery destination stored in storage 14, by executing an initialization function in smart contract CA, in response to transaction data TA being stored into the distributed ledger in step S105.

In steps S108A to S112A, after transaction data TB1 that includes smart contract CB1 is generated and ledger servers 10A and 10C give signatures to transaction data TB1, each of processors 11 of ledger servers 10A to 10C and transaction server 10T stores resultant transaction data TB1 into the distributed ledger.

Here, in step S108A, the content of obtained code and arguments passed to the initialization function are different from those in step S108 in FIG. 6. In steps S109A and S112A, the contents of transaction data are different from those in steps S109 and S112 in FIG. 6, respectively.

Each of processors 11 of ledger servers 10A to 10C and transaction server 10T executes the initialization function in smart contract CB1, in response to transaction data TB1 being stored into the distributed ledger in step S112A, to perform step S113A as below.

In step S113A, processors 11 of ledger servers 10A to 10C and transaction server 10T each set the variable indicating a price, the variable indicating a delivery date, the variable indicating a product delivery destination, and the variable indicating a relevant smart contract address, which are stored in storage 14, to the price, the delivery date, the product delivery destination, and the contract address passed to the initialization function as arguments in transaction data TB1.

Now referring to FIG. 12, in steps S201 to S209, processor 11 of transaction server 10T generates and stores transaction data TA1 that includes smart contract CA1 into the distributed ledger (see FIG. 10), in response to new transaction data TB1 being stored into the distributed ledger in step S112A. Here, the material delivery destination in smart contract CA1 is identified as company C.

Each of processors 11 of ledger servers 10A to 10C and transaction server 10T executes the initialization function in smart contract CA1, in response to transaction data TA1 being stored into the distributed ledger in step S209, to perform steps S210 and S211 as below.

In step S210, processors 11 of ledger servers 10A to 10C and transaction server 10T each set the variable indicating a price and the variable indicating a delivery date, which are stored in storage 14, to the price and the delivery date passed to the initialization function as arguments in transaction data TA1.

In step S211, each of processors 11 of ledger servers 10A to 10C and transaction server 10T sets the variable indicating a material delivery destination stored in storage 14, to identification information of company C. After that, ledger servers 10A to 10C and transaction server 10T each manage smart contract CA1 as a valid contract, and each manage smart contract CA as an invalid contract.

Transaction server 10T in contract management system 2 can change, by performing the above series of processes, information that is undetermined when company A and company B make the material contract, in response to the manufacturing contract being made between company A and company C. Accordingly, contract management system 2 can reduce an increase in power consumption of a computer system that manages contracts, while appropriately managing contracts in which company A, company B, and company C are involved.

Embodiment 3

The present embodiment describes, for instance, a contract management system that reduces an increase in power consumption of a computer system that manages contracts and a control method of the contract management system, focusing on aspects different from Embodiments 1 and 2.

In the present embodiment, a smart contract that stipulates the content of a material contract further has a function that sets a material delivery destination of the smart contract (corresponding to a setting function described later). The smart contract that stipulates the content of a manufacturing contract that is to be made later transmits a command for the smart contract to execute the setting function. The smart contract that stipulates the content of the material contract sets the material delivery destination by executing the setting function in response to the command, as change processing. Note that it can be said that the setting function is a function for changing the material delivery destination that is already set.

The following describes (1) an aspect in which the setting function is used based on contract management system 1 according to Embodiment 1, and (2) an aspect in which the setting function is used based on contract management system 2 according to Embodiment 2.

(1) Aspect in which Setting Function is Used Based on Contract Management System 1

FIG. 13 is an explanatory drawing illustrating transaction data TA2 that is a first example of transaction data in the present embodiment. Transaction data TA2 corresponds to first transaction data.

As illustrated in FIG. 13, transaction data TA2 includes "Code for smart contract CA2", "Argument passed to initialization function", "Signature 1", "Signature 2", and "Transmission date and time".

Here, transaction data TA2 is similar to transaction data TA illustrated in FIG. 4, but code for the smart contract is different. This point is to be described in detail.

"Code for smart contract CA2" includes a variable portion, an initialization function, and a setting function. The variable portion and the initialization function are the same as those included in the code for smart contract CA, and thus a description thereof is omitted.

The setting function is a function for receiving the material delivery destination as an argument. The setting function is a function for setting a variable indicating the material delivery destination, which is stored in storage 14, to the material delivery destination received as an argument.

FIG. 14 is an explanatory drawing illustrating transaction data TB2 that is a second example of transaction data in the present embodiment. Transaction data TB2 corresponds to second transaction data.

As illustrated in FIG. 14, transaction data TB2 includes "Code for smart contract CB2", "Argument passed to initialization function", "Signature 1", "Signature 2", and "Transmission date and time".

Here, transaction data TB2 is similar to transaction data TB illustrated in FIG. 5, but code for the smart contract and arguments passed to the initialization function are different. This point is to be described in detail.

"Code for smart contract CB2" includes a variable portion and an initialization function. The variable portion is the same as that included in the code for smart contract CB, and thus a description thereof is omitted.

The initialization function receives a price, a delivery date, and a product delivery destination as arguments. If the initialization function is executed, the initialization function assigns values to a variable indicating the product delivery destination, a variable indicating the price, and a variable indicating the delivery date, which are stored in storage 14. Specifically, if the initialization function is executed, the initialization function sets the variable indicating a price to the price received as an argument, sets the variable indicating a delivery date to the delivery date received as an argument, and sets the variable indicating a product delivery destination to the product delivery destination received as an argument.

The arguments passed to the initialization function in transaction data TB2 are the delivery date, the price, and the product delivery destination.

FIG. 15 is an explanatory drawing illustrating transaction data TA3 that is a third example of transaction data in the present embodiment. Transaction data TA3 is a function for executing the setting function in smart contract CA2. Storing transaction data TA3 into a distributed ledger corresponds to transmitting a command for executing the setting function in smart contract CA2.

As illustrated in FIG. 15, transaction data TA3 includes "Function to be executed", "Argument passed to setting function", "Signature 1", "Signature 2", and "Transmission date and time".

"Function to be executed" indicates a function that is executed by the smart contract being stored into a distributed ledger. In FIG. 15, the setting function in smart contract CA2 is set in "Function to be executed".

"Argument passed to setting function" is an argument that is passed to the setting function that is to be executed by smart contract CA2, and includes a material delivery destination (identification information of company C).

"Signature 1" is the first one of two digital signatures given to transaction data TA3. Signature 1 includes signature SA of company A.

"Signature 2" is the second one of the two digital signatures given to transaction data TA3. Signature 2 includes signature SB of company B.

"Transmission date and time" indicates the date and time at which transaction data TA3 is transmitted. "2018/11/01 12:00:00" is stored in "Transmission date and time".

By transaction data TA3 illustrated in FIG. 15 being stored into a distributed ledger, the material delivery destination that is an argument is set to identification information of company C, and the setting function in smart contract CA2 is executed. As a result, the material delivery destination in smart contract CA2 is changed to company C.

Figure 16:
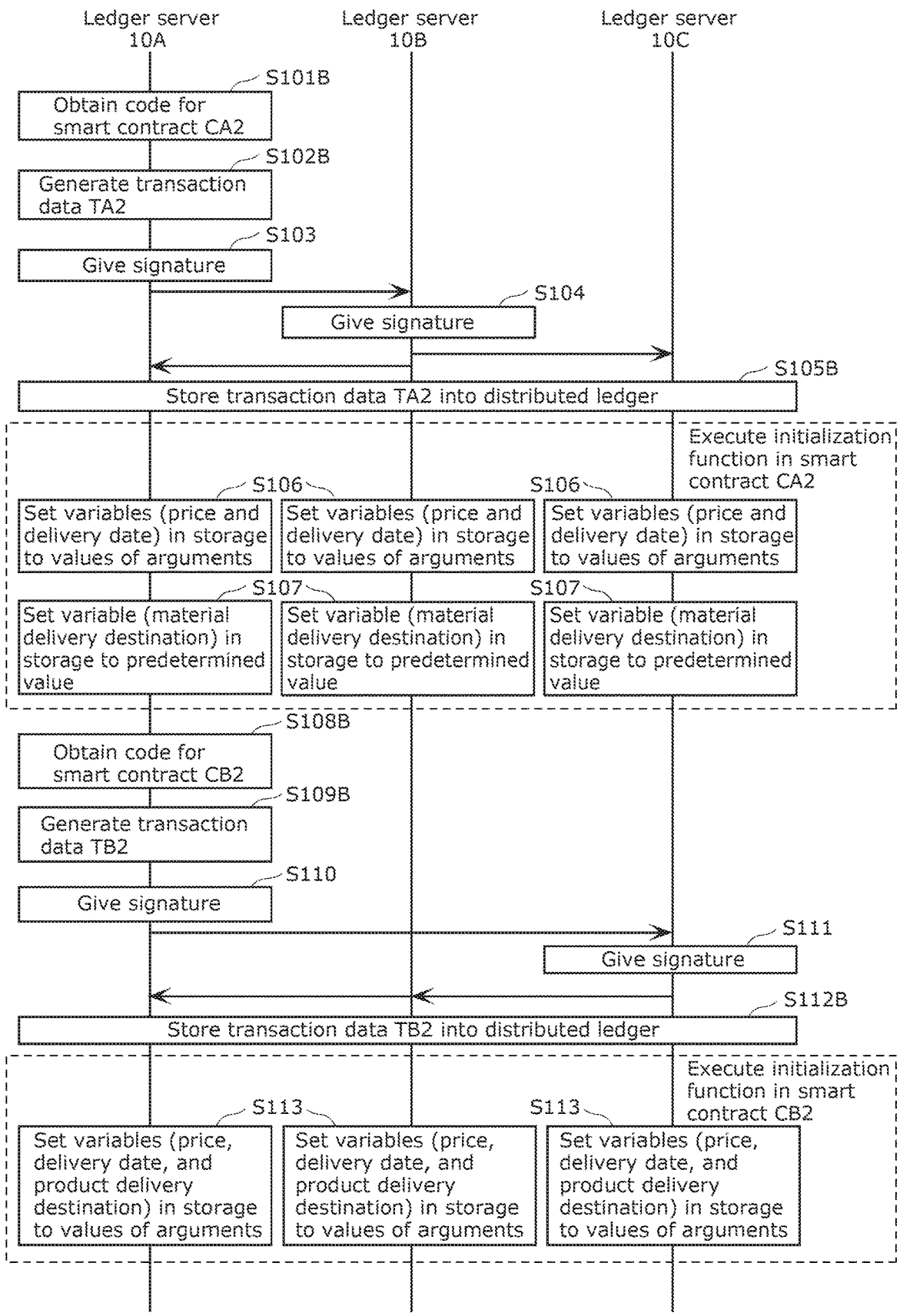
FIG. 16 is a first sequence diagram illustrating processing in a contract management system in Embodiment 3.
Figure 17:
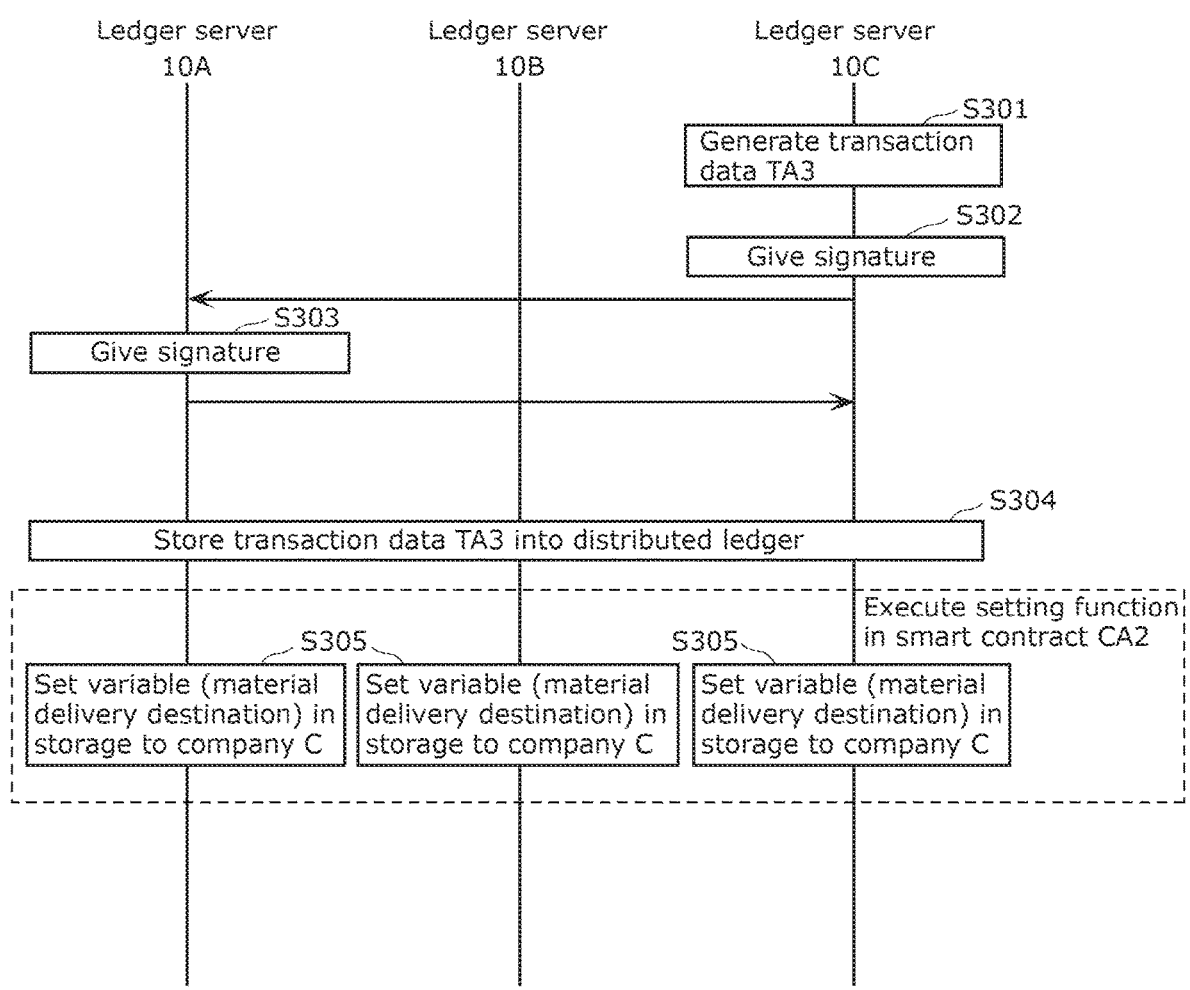
FIG. 17 is a second sequence diagram illustrating processing in the contract management system in Embodiment 3.

FIG. 16 and FIG. 17 are sequence diagrams each illustrating processing in the contract management system in the present embodiment.

In the sequence diagrams illustrated in FIG. 16 and FIG. 17, the same signs are given to the same processing as that of the sequence diagram in FIG. 6, and thus a detailed description is omitted.

In steps S101B to S105B, each of processors 11 of ledger servers 10A to 10C obtains and stores transaction data TA2 that includes code for smart contract CA2 into the distributed ledger. Storing transaction data TA2 into a distributed ledger corresponds to transmitting a command for executing the setting function in smart contract CA2.

Here, in step S101B, the content of obtained code is different from that in step S101 in FIG. 6. In steps S102B and S105B, the contents of transaction data are different from those in steps S102 and S105 in FIG. 6, respectively.

In steps S106 to S107, each of processors 11 of ledger servers 10A to 10C sets the price, the delivery date, and the material delivery destination stored in storage 14, by executing the initialization function in smart contract CA2, in response to transaction data TA2 being stored into the distributed ledger in step S105.

In steps S108B to S112B, processor 11 of ledger server 10A generates transaction data TB2 that includes smart contract CB2, and after ledger servers 10A to 10C give signatures, each of ledger servers 10A to 10C stores resultant transaction data TB2 into the distributed ledger.

Here, in step S108B, the content of obtained code and arguments passed to the initialization function are different from those in step S108 in FIG. 6. In steps S109B and S112B, the contents of transaction data are different from those in steps S109 and S112 in FIG. 6, respectively.

Each of processors 11 of ledger servers 10A to 10C executes the initialization function in smart contract CB2 in response to transaction data TB2 being stored into the distributed ledger in step S112B, to perform step S113.

Now referring to FIG. 17, processor 11 of ledger server 10C generates transaction data TA3 (see FIG. 15) in step S301.

In step S302, processor 11 of ledger server 10C gives a signature to transaction data TA3 generated in step S301, and transmits the resultant data to ledger server 10A.

In step S303, processor 11 of ledger server 10A gives a signature to transaction data TA3 obtained from processor 11 of ledger server 10C in step S302, and transmits the resultant data to ledger servers 10B and 10C.

In step S304, each of ledger servers 10A to 10C stores (transmitted) transaction data TA3 to which the signature is additionally given in step S303 into the distributed ledger. In storing transaction data TA3 into the distributed ledger, transaction data TA3 may be stored into the distributed ledgers under a condition that ledger servers 10A to 10C reach agreement based on consensus algorithm.

Each of processors 11 of ledger servers 10A to 10C executes the setting function in smart contract CA2 in response to transaction data TA3 being stored into the distributed ledger in step S304, to perform step S305 as below.

In step S305, each of processors 11 of ledger servers 10A to 10C sets the variable indicating a material delivery destination, which is stored in storage 14, to identification information of company C.

By performing the above series of processes, the contract management system according to the present embodiment can reduce, using a smart contract that includes a setting function, an increase in power consumption of a computer system that manages contracts, while appropriately managing contracts in which company A, company B, and company C are involved.

(2) Aspect in which Setting Function is Used Based on Contract Management System 2

Figure 18:
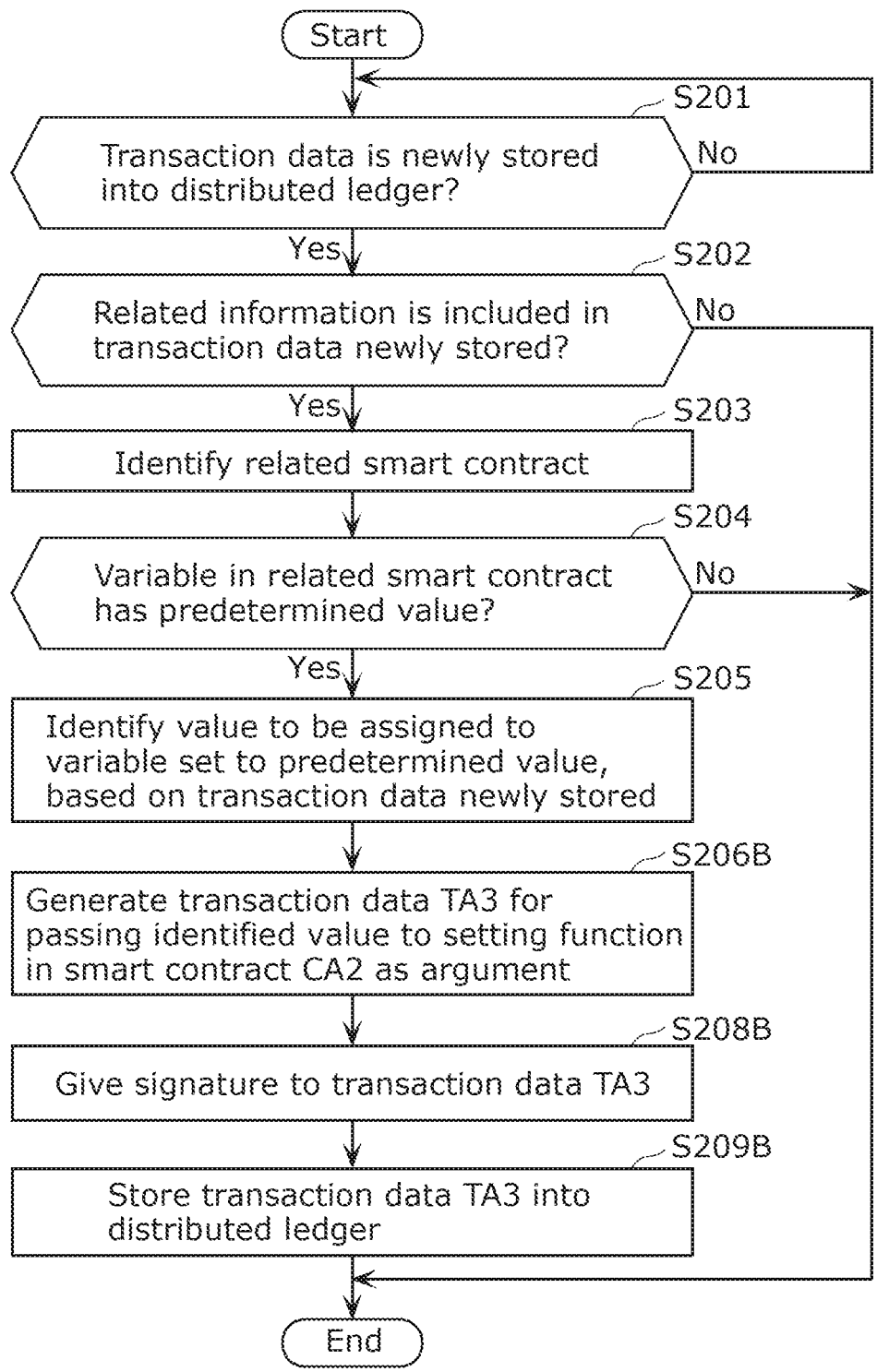
FIG. 18 is a flowchart illustrating processing performed by a transaction server in Embodiment 3.

FIG. 18 is a flowchart illustrating processing performed by transaction server 10T in the present embodiment.

Processing performed by transaction server 10T, which is illustrated in FIG. 18, is similar to the processing performed by transaction server 10T in Embodiment 2 (see FIG. 10). Differences are to be mainly described.

In steps S201 to S205, when transaction data is newly stored into a distributed ledger, transaction server 10T identifies a value that is to be set as a predetermined value of a smart contract that is related to smart contract CB included in the transaction data.

In step S206B, processor 11 of transaction server 10T generates transaction data TA3 for passing the value identified in step S205 as an argument to the setting function in smart contract CA2.

In step S208B, processor 11 of transaction server 10T gives a signature to transaction data TA3 generated in step S206B.

In step S209B, processor 11 of transaction server 10T stores transaction data TA3 to which the signature is given in step S208B into the distributed ledger. At this time, each of processors 11 of ledger servers 10A to 10C stores transaction data TA3 to which the signature is given in step S208B into the distributed ledger.

Figure 19:
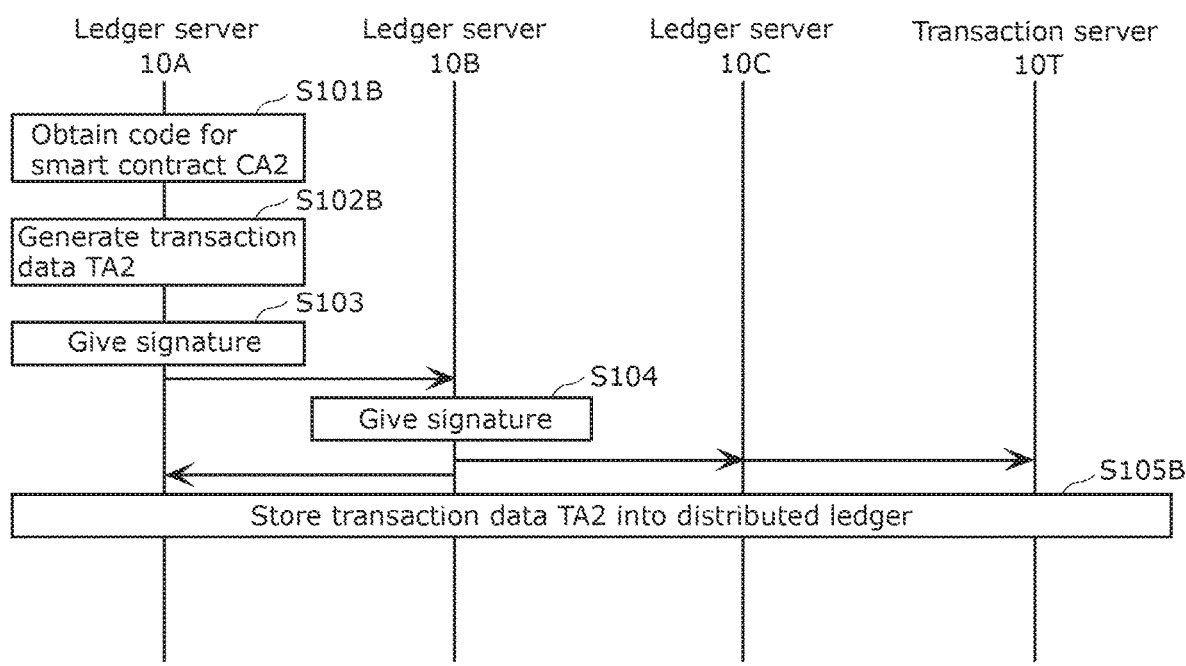
FIG. 19 is a third sequence diagram illustrating processing in the contract management system in Embodiment 3.
Figure 20:
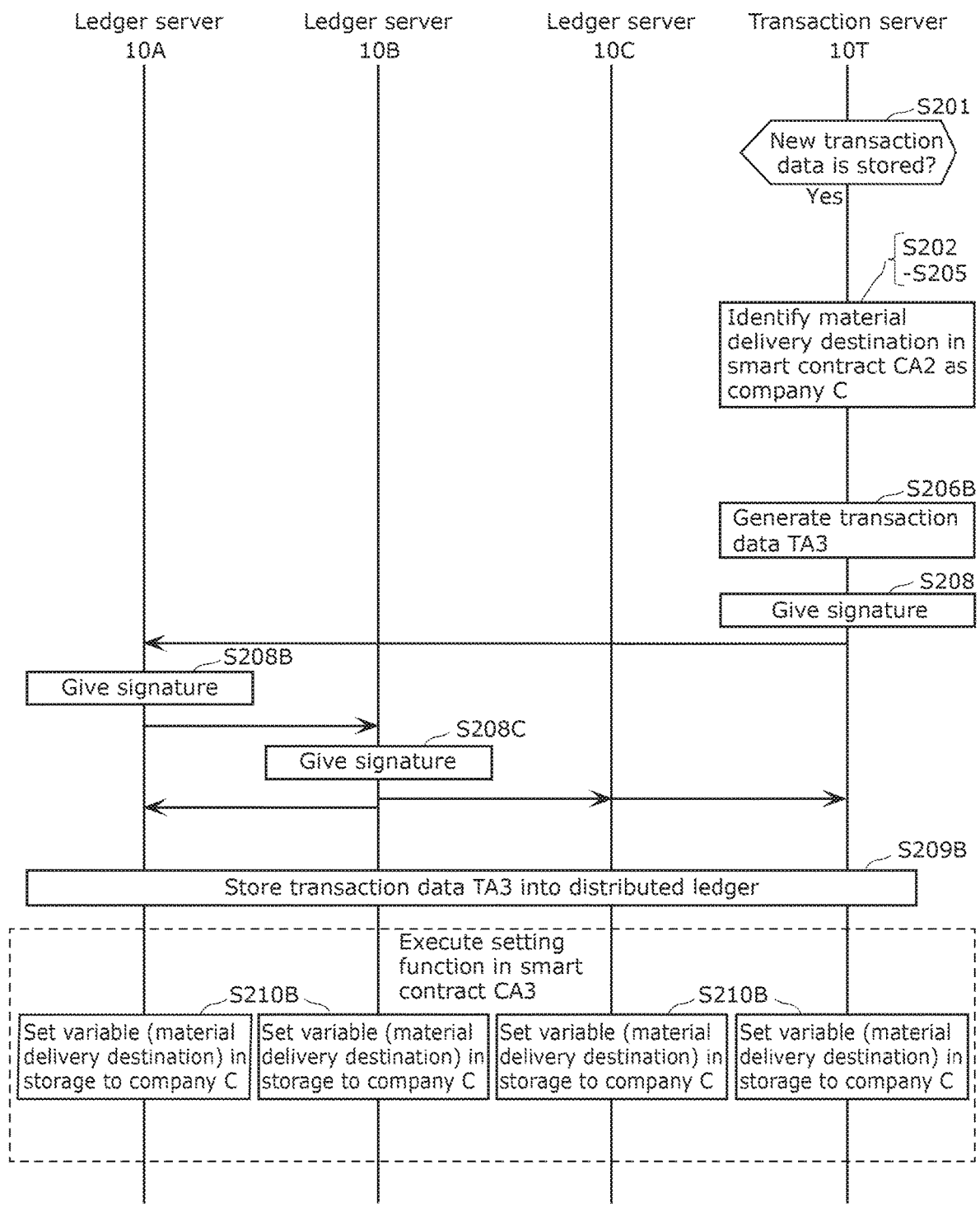
FIG. 20 is a fourth sequence diagram illustrating processing in the contract management system in Embodiment 3.

FIG. 19 and FIG. 20 are sequence diagrams each illustrating processing in the contract management system in the present embodiment.

The processing in the contract management system in the present embodiment is similar to the processing illustrated in FIG. 11. Differences from the processing illustrated in FIG. 11 are to be described.

The processing illustrated in FIG. 19 is an excerpt of a portion corresponding to the processing in steps S101 to S105 in FIG. 11.

In steps S101B to S105B, each of processors 11 of ledger servers 10A to 10C and transaction server 10T obtains and stores transaction data TA2 that includes code for smart contract CA2 into the distributed ledger.

Here, in step S101B, the content of the obtained code is different from that in step S101 in FIG. 6. In steps S102B and S105B, the contents of transaction data are different from those in steps S102 and S105 in FIG. 6, respectively.

The processing in step S106 and thereafter is the same as the processing in step S106 and thereafter in FIG. 11, and thus illustration thereof is omitted.

The processing illustrated in FIG. 20 is similar to the processing illustrated in FIG. 12. Differences from the processing illustrated in FIG. 12 are to be described.

In FIG. 20, in steps S201 to S209B, transaction data TA3 is generated and stored into the distributed ledgers, in response to new transaction data TB1 being stored into the distributed ledgers in step S112A (see FIG. 11). Here, the material delivery destination of smart contract CA2 is identified as being company C, and is set as an argument that is passed to the setting function in transaction data TA3.

Each of processors 11 of ledger servers 10A to 10C and transaction server 10T executes the setting function in response to transaction data TA3 being stored into the distributed ledger in step S209, to perform step S210B as below.

In step S210B, each of processors 11 of ledger servers 10A to 10C and transaction server 10T executes the above setting function to set the variable indicating a material delivery destination, which is stored in storage 14, to the material delivery destination passed to the setting function as an argument in transaction data TA3.

By performing the above series of processes, the contract management system according to the present embodiment can reduce, using a smart contract that includes a setting function, an increase in power consumption of a computer system that manages contracts, while appropriately managing contracts in which company A, company B, and company C are involved.

Variation 1

Figure 21:
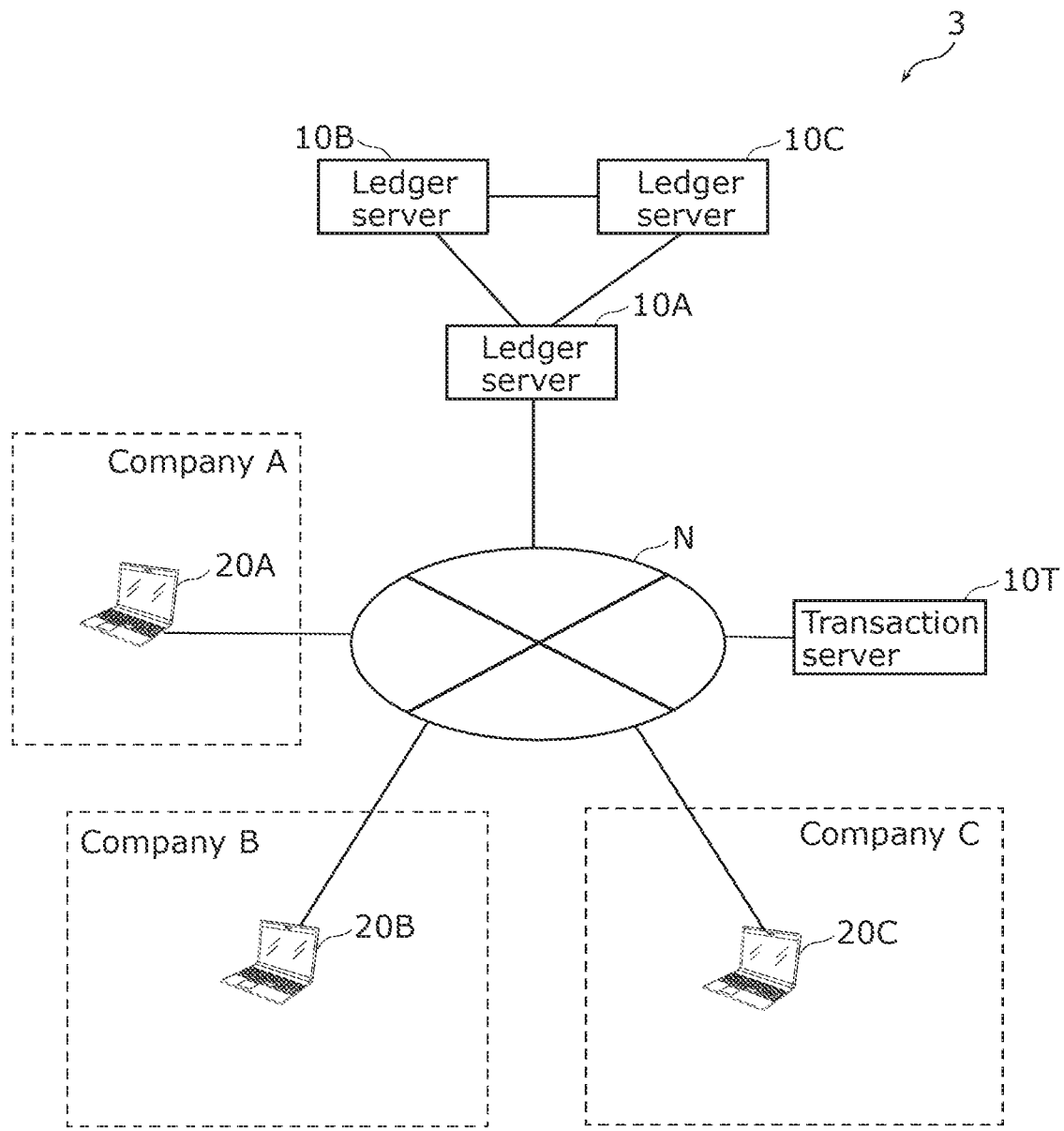
FIG. 21 is a block diagram schematically illustrating a configuration of a contract management system in Variation 1.

FIG. 21 is a block diagram schematically illustrating a configuration of contract management system 3 in this variation. Contract management system 3 in this variation is a variation of contract management system 2 in Embodiment 2 or the contract management system in aspect (2) of Embodiment 3.

Contract management system 3 illustrated in FIG. 21 includes ledger servers 10A, 10B, and 10C, terminals 20A, 20B, and 20C, and transaction server 10T.

In contract management system 3, ledger servers 10A, 10B, and 10C are collectively disposed in a single location.

More generally, ledger servers 10A, 10B, and 10C are not necessarily disposed in company A, company B, and company C, respectively, and may be disposed in any locations where direct or indirect connection to network N is possible.

Such disposition of ledger servers 10A to 10C may achieve similar functions and yield similar advantageous effects to those of contract management system 2 in Embodiment 2 or the contract management system in aspect (2) in Embodiment 3.

Variation 2

Figure 22:
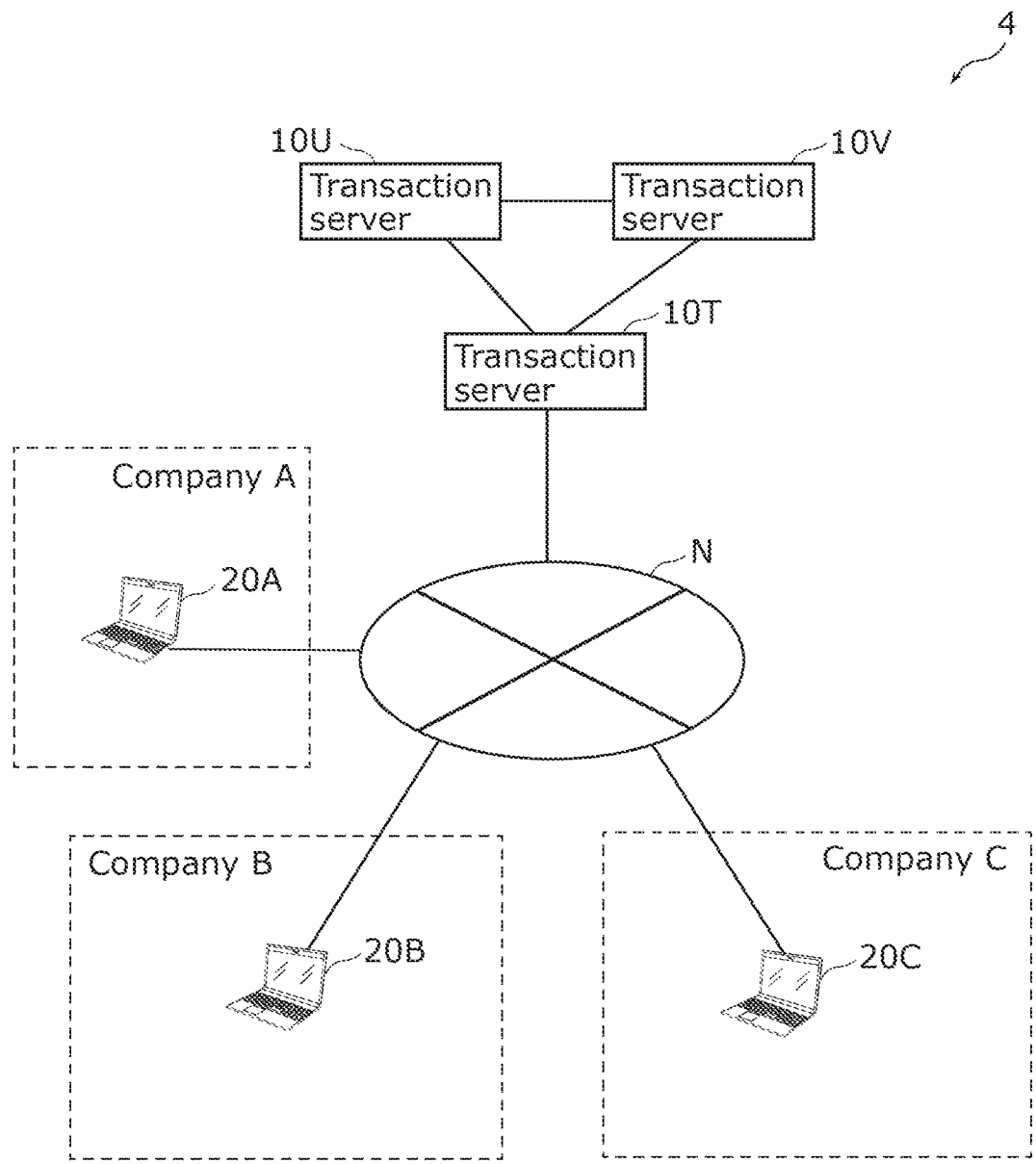
FIG. 22 is a block diagram schematically illustrating a configuration of a contract management system in Variation 2.

FIG. 22 is a block diagram schematically illustrating a configuration of contract management system 4 in this variation. Contract management system 4 in this variation is a variation of contract management system 2 in Embodiment 2 or the contract management system in aspect (2) of Embodiment 3.

Contract management system 4 illustrated in FIG. 22 includes transaction servers 10T, 10U, and 10V, and terminals 20A, 20B, and 20C.

In contract management system 4, transaction server 10T, 10U, and 10V also have the functions of ledger servers 10A, 10B, and 10C. Note that transaction servers 10T, 10U, and 10V are collectively disposed in a single location similarly to ledger servers 10A to 10C in Variation 1 of Embodiment 3, but may be disposed in company A, company B, and company C, respectively, as in Embodiment 3.

Such disposition of transaction servers 10T to 10V may achieve similar functions and yield similar advantageous effects to those of contract management system 2 in Embodiment 2 or the contract management system in aspect (2) in Embodiment 3.

Supplement

Blockchains in the above embodiments and variations are to be supplementally described.

Figure 23:
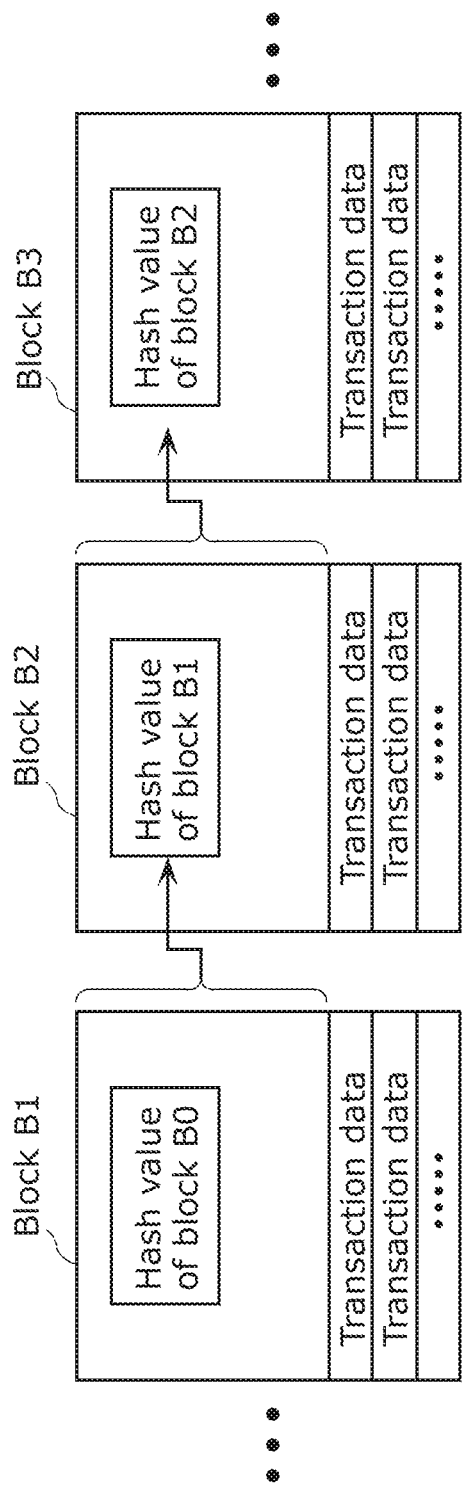
FIG. 23 is an explanatory drawing illustrating a data structure of a blockchain.

FIG. 23 is an explanatory drawing illustrating a data structure of a blockchain.

A blockchain is formed into a chain constituted by connecting blocks that are recording units. Each block includes a plurality of transaction data items and a hash value of a previous block. Specifically, block B2 includes a hash value of previous block B1. A hash value calculated from a plurality of transaction data items included in block B2 and the hash value of block B1 is included in block B3 as a hash value of block B2. In this manner, blocks are connected into a chain with the content of a previous block being included as a hash value, so that manipulation of recorded transaction data is effectively prevented.

If past transaction data is changed, the hash value of a block becomes different from the value before being changed. Thus, in order to make the manipulated block appear valid, it is necessary to recreate all the blocks after the manipulated block, and this work is extremely difficult from the practical view. Difficulty in manipulation of a blockchain is ensured using such a feature.

Figure 24:
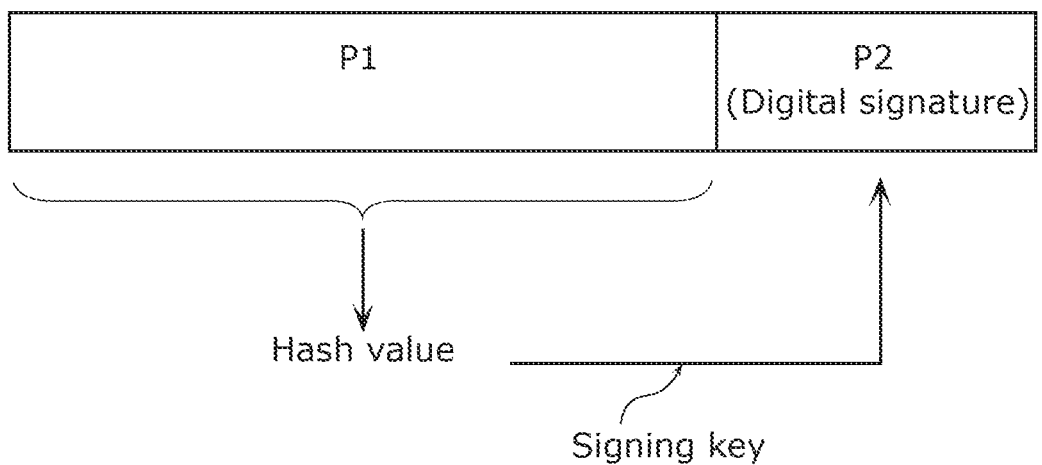
FIG. 24 is an explanatory drawing illustrating a data structure of transaction data.

FIG. 24 is an explanatory drawing illustrating a data structure of transaction data.

Transaction data illustrated in FIG. 24 includes transaction body P1 and digital signature P2. Transaction body P1 is a data body included in the transaction data. Digital signature P2 is generated by adding a signature to the hash value of transaction body P1 using a signing key of a creator of the transaction data, or more specifically, by encrypting data using the signing key of the creator.

Transaction data has digital signature P2, and thus it is substantially impossible to manipulate such transaction data. Accordingly, manipulation of a transaction body can be prevented.

Note that in the above embodiments, each of the elements may be acquired using dedicated hardware, or may be obtained by executing a software program suitable for the element. Each element may be acquired by a program executor such as a CPU or a processor reading and executing a software program recorded on a recording medium such as a hard disk or semiconductor memory. Here, the software that acquires, for instance, the contract management system according to the above embodiments is a program as below.

Specifically, the program causes a computer to execute a control method executed by a device out of a plurality of devices each having a distributed ledger in a contract management system that includes the plurality of devices, the control method including: obtaining first transaction data that includes a first variable and a second variable, the first variable indicating first information on a first contract made between a first user and a second user, the second variable indicating second information different from the first information on the first contract and being set to a predetermined value indicating that the second information is undetermined; storing the first transaction data obtained into the distributed ledger; executing storing processing of reading out the second variable included in the first transaction data stored in the distributed ledger, and storing the second variable into a storage included in the device, the storage being rewritable; obtaining second transaction data that includes a third variable and a change command, the third variable indicating third information on a second contract made between the first user and a third user, the change command being a command for changing the second variable, based on the third variable; storing the second transaction data obtained into the distributed ledger; and executing change processing of changing, according to the change command, the second variable stored in the storage from the predetermined value, after the second transaction data is stored into the distributed ledger.

The above has given a description of the contract management system and others according to one or more aspects, based on the embodiments, yet the present disclosure is not limited to these embodiments. The scope of one or more aspects may also encompass embodiments as a result of adding, to the embodiments, various modifications that may be conceived by those skilled in the art, and embodiments obtained by combining elements in different embodiments, as long as the resultant embodiments do not depart from the gist of the present disclosure.

INDUSTRIAL APPLICABILITY

The present disclosure is applicable to a contract management system that manages contracts.

The invention claimed is:

1. A control method executed by a device out of a plurality of devices in a contract management system that includes the plurality of devices, the plurality of devices are directly or indirectly connected to a network in a manner that the plurality of devices can communicate with one another via the network, the control method comprising:

obtaining first transaction data that includes a first variable and a second variable, the first variable indicating first information on a first contract made between a first user and a second user, the second variable indicating second information different from the first information on the first contract and being set to a predetermined value indicating that the second information is undetermined;

storing the first transaction data obtained into a distributed ledger;

executing storing processing of reading out the second variable included in the first transaction data stored in the distributed ledger, and storing the second variable into a storage included in the device, the storage being rewritable, the storage also being separate from the distributed ledger;

obtaining second transaction data that includes a third variable and a change command, the third variable indicating third information on a second contract made between the first user and a third user, the change command being a command for changing the second variable, based on the third variable;

storing the second transaction data obtained into the distributed ledger; and executing change processing of changing, according to the change command, the second variable stored in the storage from the predetermined value, after the second transaction data is stored into the distributed ledger, wherein the first contract includes a contract that stipulates that the first user is to purchase material from the second user, and the material purchased is to be delivered to a delivery destination, the first information includes a purchase price of the material and a deadline for delivering the material, the second information includes the delivery destination of the material, the second contract includes a contract that stipulates that the third user is to manufacture a product from the material delivered from the second user, and deliver the product to the first user, and the third information includes a purchase price of the product, a deadline for delivering the product, and a delivery destination of the product.

2. The control method according to claim 1, wherein the first contract is a contract in which a related user is involved, the related user being different from the first user and the second user, the second information includes identification information of the related user, the second contract is made between the first user and the third user, the third user being the related user, and the change processing is processing of changing, according to the change command, the second variable stored in the storage from the predetermined value to the identification information of the third user, the third user being the related user.

3. The control method according to claim 1, wherein the first transaction data includes first contract code that includes the first variable, the second variable, and a storing command for storing the first variable and the second variable into the storage, and the storing processing is performed by a contract executor executing the storing command included in the first contract code, in response to the first transaction data being stored into the distributed ledger, the contract executor being included in the device.

4. The control method according to claim 3, wherein the first contract code includes a setting function that sets the second variable stored in the storage, and when third transaction data that includes a command for executing the setting function is obtained, the change processing is performed by the contract executor executing the setting function, in response to the third transaction data obtained being stored into the distributed ledger.

5. The control method according to claim 1, wherein the second transaction data includes second contract code that includes the third variable and the change command, and the change processing is performed by a contract executor executing the change command, in response to the second transaction data being stored into the distributed ledger, the contract executor being included in the device.

6. The control method according to claim 1, wherein the first transaction data includes a digital signature of the first user and a digital signature of the second user, and in storing the first transaction data into the distributed ledger, the first transaction data is stored into the distributed ledger when the digital signature of the first user and the digital signature of the second user that are included in the first transaction data are both successfully verified.

7. The control method according to claim 1, wherein the second transaction data includes a digital signature of the first user and a digital signature of the third user, and in storing the second transaction data into the distributed ledger, the second transaction data is stored into the distributed ledger when the digital signature of the first user and the digital signature of the third user that are included in the second transaction data are both successfully verified.

8. A device out of a plurality of devices in a contract management system that includes the plurality of devices, the plurality of devices are directly or indirectly connected to a network in a manner that the plurality of devices can communicate with one another via the network, the device comprising:

a processor;

a ledger storage that stores therein a distributed ledger;

an executor; and a storage that is rewritable, wherein the processor obtains first transaction data that includes a first variable and a second variable, and stores the first transaction data obtained into the distributed ledger, the first variable indicating first information on a first contract made between a first user and a second user, the second variable indicating second information different from the first information on the first contract and being set to a predetermined value indicating that the second information is undetermined, the executor executes storing processing of reading out the second variable included in the first transaction data stored in the distributed ledger, and storing the second variable into the storage, the storage also being separate from the distributed ledger, the processor further obtains second transaction data that includes a third variable and a change command, and stores the second transaction data obtained into the distributed ledger, the third variable indicating third information on a second contract made between the first user and a third user, the change command being a command for changing the second variable, based on the third variable, and the executor executes change processing of changing, according to the change command, the second variable stored in the storage from the predetermined value, after the second transaction data is stored into the distributed ledger, wherein the first contract includes a contract that stipulates that the first user is to purchase material from the second user, and the material purchased is to be delivered to a delivery destination, the first information includes a purchase price of the material and a deadline for delivering the material, the second information includes the delivery destination of the material, the second contract includes a contract that stipulates that the third user is to manufacture a product from the material delivered from the second user, and deliver the product to the first user, and the third information includes a purchase price of the product, a deadline for delivering the product, and a delivery destination of the product.

9. A non-transitory computer-readable recording medium having recorded thereon a program for causing a computer to execute a control method executed by a device out of a plurality of devices in a contract management system that includes the plurality of devices, the plurality of devices are directly or indirectly connected to a network in a manner that the plurality of devices can communicate with one another via the network, the control method comprising:

obtaining first transaction data that includes a first variable and a second variable, the first variable indicating first information on a first contract made between a first user and a second user, the second variable indicating second information different from the first information on the first contract and being set to a predetermined value indicating that the second information is undetermined;

storing the first transaction data obtained into a distributed ledger;

executing storing processing of reading out the second variable included in the first transaction data stored in the distributed ledger, and storing the second variable into a storage included in the device, the storage being rewritable, the storage also being separate from the distributed ledger;

obtaining second transaction data that includes a third variable and a change command, the third variable indicating third information on a second contract made between the first user and a third user, the change command being a command for changing the second variable, based on the third variable;

storing the second transaction data obtained into the distributed ledger; and executing change processing of changing, according to the change command, the second variable stored in the storage from the predetermined value, after the second transaction data is stored into the distributed ledger, wherein the first contract includes a contract that stipulates that the first user is to purchase material from the second user, and the material purchased is to be delivered to a delivery destination, the first information includes a purchase price of the material and a deadline for delivering the material, the second information includes the delivery destination of the material, the second contract includes a contract that stipulates that the third user is to manufacture a product from the material delivered from the second user, and deliver the product to the first user, and the third information includes a purchase price of the product, a deadline for delivering the product, and a delivery destination of the product.

10. The control method according to claim 1, wherein in the executing of the storing processing, a variable stored in the storage is set to the predetermined value included in the first transaction data, and in the executing of the change processing, the predetermined value stored in the storage is changed.

* * * * *